US012195588B2

(12) United States Patent
Foley et al.

(10) Patent No.: US 12,195,588 B2
(45) Date of Patent: *Jan. 14, 2025

(54) POLYETHER DERIVATIVES, USES, AND METHODS OF MAKING THE SAME

(71) Applicant: P2 Science, Inc., Woodbridge, CT (US)

(72) Inventors: Patrick Foley, New Haven, CT (US); Yonghua Yang, New Haven, CT (US); Tania Salam, New Haven, CT (US)

(73) Assignee: P2 SCIENCE, INC., Woodbridge, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,949

(22) Filed: Oct. 17, 2023

(65) Prior Publication Data

US 2024/0092970 A1 Mar. 21, 2024

Related U.S. Application Data

(63) Continuation of application No. 18/051,599, filed on Nov. 1, 2022, now Pat. No. 11,827,746, which is a continuation of application No. 17/069,696, filed on Oct. 13, 2020, now Pat. No. 11,518,850, which is a continuation of application No. 16/779,232, filed on Jan. 31, 2020, now Pat. No. 10,844,169, which is a continuation of application No. PCT/US2018/044657, filed on Jul. 31, 2018.

(60) Provisional application No. 62/662,177, filed on Apr. 24, 2018, provisional application No. 62/617,924, filed on Jan. 16, 2018, provisional application No. 62/539,319, filed on Jul. 31, 2017.

(51) Int. Cl.
*C08G 65/00* (2006.01)

(52) U.S. Cl.
CPC ....... *C08G 65/002* (2013.01); *C08G 2650/38* (2013.01)

(58) Field of Classification Search
USPC .................................................. 554/223, 227
See application file for complete search history.

(56) References Cited

U.S. PATENT DOCUMENTS

| 2,020,298 | A | 11/1935 | Carothers et al. |
| 3,829,505 | A | 8/1974 | Johnston |
| 3,980,697 | A | 9/1976 | El-Chahawi et al. |
| 4,218,379 | A | 8/1980 | Harris et al. |
| 4,366,270 | A | 12/1982 | Ruter |
| 4,381,416 | A | 4/1983 | Kyo et al. |

(Continued)

FOREIGN PATENT DOCUMENTS

| DE | 10 2005 025 739 A1 | 12/2006 |
| EP | 0841333 A1 | 5/1998 |

(Continued)

OTHER PUBLICATIONS

Abstract of Japanese Patent Application No. 2006-273796, published Oct. 12, 2006 (1 page).

(Continued)

*Primary Examiner* — Fred M Teskin
(74) *Attorney, Agent, or Firm* — Hoxie & Associates LLC

(57) ABSTRACT

The invention contemplates certain polyethers, polyether derivatives, and methods of making and using those same polymers. For example, the starting materials can, e.g., citronellol, prenol, isocitronellol and isoprenol.

28 Claims, 3 Drawing Sheets

(56) References Cited

U.S. PATENT DOCUMENTS

| | | | |
|---|---|---|---|
| 5,030,768 | A | 7/1991 | Chen et al. |
| 5,264,547 | A | 11/1993 | Yamaguchi et al. |
| 5,292,845 | A | 3/1994 | Kawasaki et al. |
| 5,531,910 | A | 7/1996 | Severns et al. |
| 5,616,679 | A | 4/1997 | Fies et al. |
| 6,359,101 | B1 | 3/2002 | O'Connor et al. |
| 7,355,066 | B1 | 4/2008 | Johnson et al. |
| 9,982,073 | B2 | 5/2018 | Ghandi et al. |
| 10,059,801 | B2 | 8/2018 | Foley et al. |
| 10,844,169 | B2 | 11/2020 | Foley et al. |
| 11,008,271 | B2 | 5/2021 | Yang et al. |
| 11,872,300 | B2 * | 1/2024 | Foley ................. A61Q 5/02 |
| 2005/0256347 | A1 * | 11/2005 | Goebbel ............ C07C 29/141 568/881 |
| 2017/0057940 | A1 | 3/2017 | Foley et al. |
| 2017/0088536 | A1 | 3/2017 | Foley et al. |
| 2017/0283553 | A1 | 10/2017 | Foley et al. |

FOREIGN PATENT DOCUMENTS

| | | |
|---|---|---|
| GB | 1266091 | 3/1972 |
| JP | 2006-273796 A | 10/2006 |
| JP | 2008-050415 A | 3/2008 |
| WO | WO 2001/004178 | 1/2001 |
| WO | WO 2006/057086 | 6/2006 |
| WO | WO 2016/033437 | 3/2016 |

OTHER PUBLICATIONS

Abstract of Japanese Patent Application No. 2008-050415, published Mar. 6, 2008 (1 page).
Bai, et al., "Strategies and Methods for the Synthesis of Anticancer Natural Product Neopeltolide and its Analogs," *Curr Org Chem.*, vol. 19, No. 10, 33 pages, (2015); DOI: 10.2174/1385272819666150119225149.
Cahn, et al., "Specification of Configuration about Quadricovalent Asymmetric Atoms," *J Chem Soc.*, pp. 612-622, (1951); Downloaded by Reprints Desk on Mar. 22, 2016.
Cahn, et al., "The Specification of Asymmetric Configuration in Organic Chemistry," *Experientia*, vol. 12, No. 3, pp. 81-94, (1956).
Cahn, "An Introduction to the Sequence Rule: A System for the Specification of Absolute Configuration," *Journal of Chemical Education*, vol. 41, No. 3, pp. 116-125, (1964).
Cahn, et al., "Specification of Molecular Chirality," *Agnew. Chem. Inter. Edit.*, vol. 5, No. 4, pp. 385-415, (1966).
DaSilva, et al., "Novel Palladium-Catalyzed Oxidative Intramolecular Cyclization of β-Citronellol with $H_2O_2$: A Green and Selective Process to Synthesize Oxocine," *Catalysis Letters*, vol. 147, No. 7, 7 pages (2017), Abstract Only.
Désaubry, et al., "Toward Higher Polyprenols Under 'Prebiotic' Conditions," *Tetrahedron Letters*, Issue 44, pp. 6959-6961, (2003); DOI: 10.1016/S0040-4039(03)01624-1.
Hanson, "Chiral Acylic Synthetic Intermediates from Readily Available Monoterpenoids," *Journal of Chemical Research*, vol. 39, pp. 617-621, (2015).
International Search Report for International Application No. PCT/US2018/044657, mailed Sep. 25, 2018, 4 pages.
Ireland, et al., "The Claisen Rearrangement of N-Allylketene O,N-Acetals," *J.Org.Chem.*, vol. 39, No. 3, pp. 421-424, (1974).
Nagai, "The Formation of Ethers from dl-Citronellol in the Presence of Boron Trifluoride Etherate," *Bulletin of the Chemical Society of Japan*, vol. 49, No. 1, pp. 265-269, (1976).
Nagai, et al., "The Formation of Ethers from Unsaturated Aliphatic Alcohols in the Presence of Boron Trifluoride Etherate," *Bulletin of the Chemical Society of Japan*, vol. 51, No. 11, pp. 3273-3276, (1978).
PubChem CID 13469549, 11 pages, (2007); retrieved on Sep. 10, 2018 from http://pubchem.ncbi.nlm.nih.gov/compound/013469549#section=Top>.
Rashid, et al., "Enzymatic Synthesis of Citronellyl Palmitate in Organic Media: Process Optimization and Kinetic Evaluation," *Asian Journal of Chemistry*, vol. 28, No. 2, pp. 298-300, (2016); http://dx.doi.org/10.14233/ajchem.2016.19276.
Takahashi, et al., "Cationic Polymerization Behavior of Alkoxyallenes," *Macromolecules*, vol. 28, No. 4, pp. 866-869, (1995).
Worzakowska, "Synthesis, Characterization, and Thermal Properties of New Flavor Compounds," *J Therm Anal Calorim*, vol. 116, pp. 727-736, (2014); DOI: 10.1007/s10973-013-3541-1.
Worzakowska, "Thermal Properties of Neryl Long-Chain Esters Obtained Under Microwave Irradiation," *J Therm Anal Calorim*, vol. 120, pp. 1715-1722, (2015); DOI: 10.1007/s10973.015-4489-0.
Written Opinion for International Application No. PCT/US2018/044657, mailed Sep. 25, 2018, 7 pages.
Paroul, et al., "Solvent-Free Production of Bioflavors by Enzymatic Esterification of Citronella (*Cymbopogon winterianus*) Essential Oil", Applied Biochemistry and Biotechnology, 166: 13-21 (2012); Abstract Only.
Swift, et al., "Catalytic Transformations of the Major Terpene Feedstocks", Topics in Catalysis, 27(1-4): 143-155 (2004).

* cited by examiner

Citronellol Series Ethers, where R = a UV absorbing moiety, an anti-aging moiety, an antioxidant moiety, a lipophilic moiety, or a hydrophilic moiety, and n= 2-20

Prenyl Series Ethers, where R = a UV absorbing moiety, an anti-aging moiety, an antioxidant moiety, a lipophilic moiety, or a hydrophilic moiety, and n= 2-20

POLYETHER DERIVATIVES, USES, AND METHODS OF MAKING THE SAME

CROSS REFERENCE TO RELATED APPLICATIONS

This application is a continuation of U.S. application Ser. No. 18/051,599, filed on Nov. 1, 2022, which is a continuation of U.S. application Ser. No. 17/069,696, filed on Oct. 13, 2020, which is a continuation of U.S. application Ser. No. 16/779,232, filed on Jan. 31, 2020, which is a continuation of International Application No. PCT/US2018/044657, filed Jul. 31, 2018, which claims priority to and the benefit of U.S. Provisional Patent Application Ser. Nos. 62/539,319, filed on Jul. 31, 2017; 62/617,924, filed on Jan. 16, 2018; and 62/662,177, filed on Apr. 24, 2018; the contents of each of which are hereby incorporated by reference in their entireties.

FIELD

The invention contemplates certain polyethers, polyether derivatives, and methods of making and using the same. For example, the starting materials can be, e.g., citronellol, prenol, isocitronellol and isoprenol.

BACKGROUND

Liquid polymers have important utility in cosmetic and personal care applications and play critical roles in visual displays, rheology, tribology, and drug delivery. For example, they can be used as lubricants, emollients, or as protective barriers for skin healing and UV protection. Ideally, these materials can be produced in a facile manner, be easily derivatized to modify function, and even more preferably be made from safe and sustainable raw materials.

Citronellol, prenol, and isoprenol are all naturally occurring molecules that are also commercially available on a large scale. However, these molecules possess an under-utilized combination of functionalities that allow them to be polymerized and functionalized: an isobutylenic group and an alcohol.

This type of chemistry has been mostly neglected in polymer chemistry. One reason for this could be due to the fact that the polymerization is an equilibrium reaction, and that readily abundant isobutylenic alcohols have not always been available. In recent years, however, the production of citronellol has been increasing rapidly, and one of the largest production routes also uses prenol and isoprenol as intermediates, thereby greatly increasing availability.

However, as mentioned above, the equilibrium nature of the polymerization reaction can potentially make it challenging to produce desired ethers on a large scale. There is a need for strategies and methods of production which allow efficient manufacture of these compounds.

BRIEF SUMMARY

In a surprising advancement in polymer science, PCT/US2015/047397 (U.S. equivalent US2017/0283553) and PCT/US20151016371 (U.S. equivalent US201710057940), the contents of each of which are incorporated herein by reference, have taught how to use these functionalities to make new polyether compositions of matter. These polyethers represent an advance in liquid polymer technology and carry with them many desirable benefits for commercial fields of application.

The present disclosure contemplates building on the Applicants' own aforementioned patent applications by invoking novel derivatization strategies and methods of production. In still a further aspect, this disclosure teaches methods for controlled release of the monomers contained within these polyether polymers for use in, e.g., fragrance and pest control.

Generally, the present disclosure provides compounds according to Formula Y below:

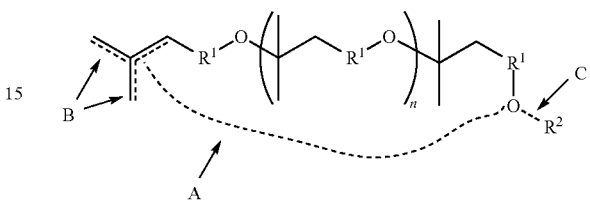

wherein the dashed bonds (A, B and C) represent optional bonds, and wherein $R^1$ is optionally substituted $C_1$-$C_{12}$ alkyl; $R^2$ is H, $C_{1-20}$alkyl, aryl, aryl-$C_{1-2}$ alkyl, optionally unsaturated alkyl esters or aryl esters, or $R^2$ is a moiety:

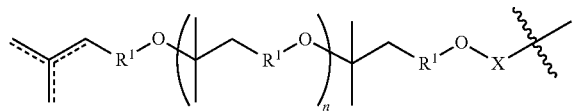

wherein X is a diacyl moiety of formula —C(O)—$R^3$—C(O)—, wherein $R^3$ is optionally substituted $C_{1-22}$ alkyl, optionally substituted $C_{2-22}$ alkenyl or optionally substituted aryl; and wherein n is an integer between 0 and 20;

provided that if the intramolecular bridging bond A is present then dashed bonds B and C are absent and substituent $R^2$ is absent. It is understood that ═════ represents an optional double bond (i.e. either a single or double bond), and thus that the terminal group,

may have any one of the three indicated optional bonds present (i.e., a double bond) or all optional bonds absent (i.e., all single bonds).

In further aspects, the present disclosure provides methods of manufacturing said compounds and methods of using said compounds.

DETAILED DESCRIPTION

Figure 1:
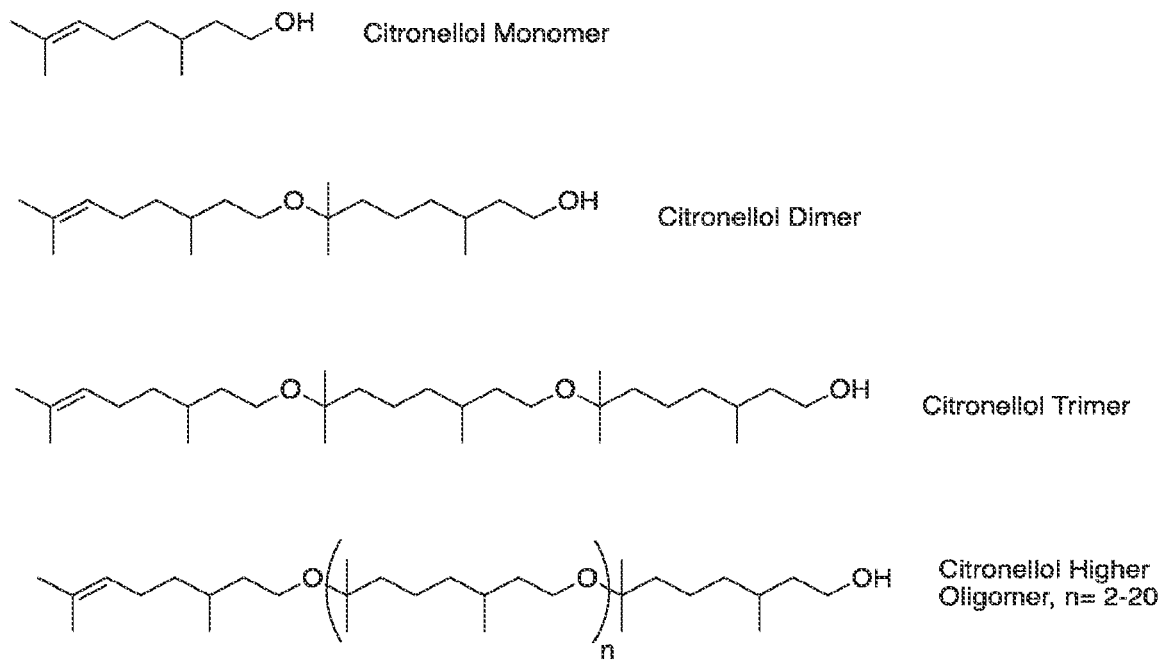
FIG. 1 provides a generic depiction of citronellol monoethers, polyethers and the citronellol monomer.
Figure 2:
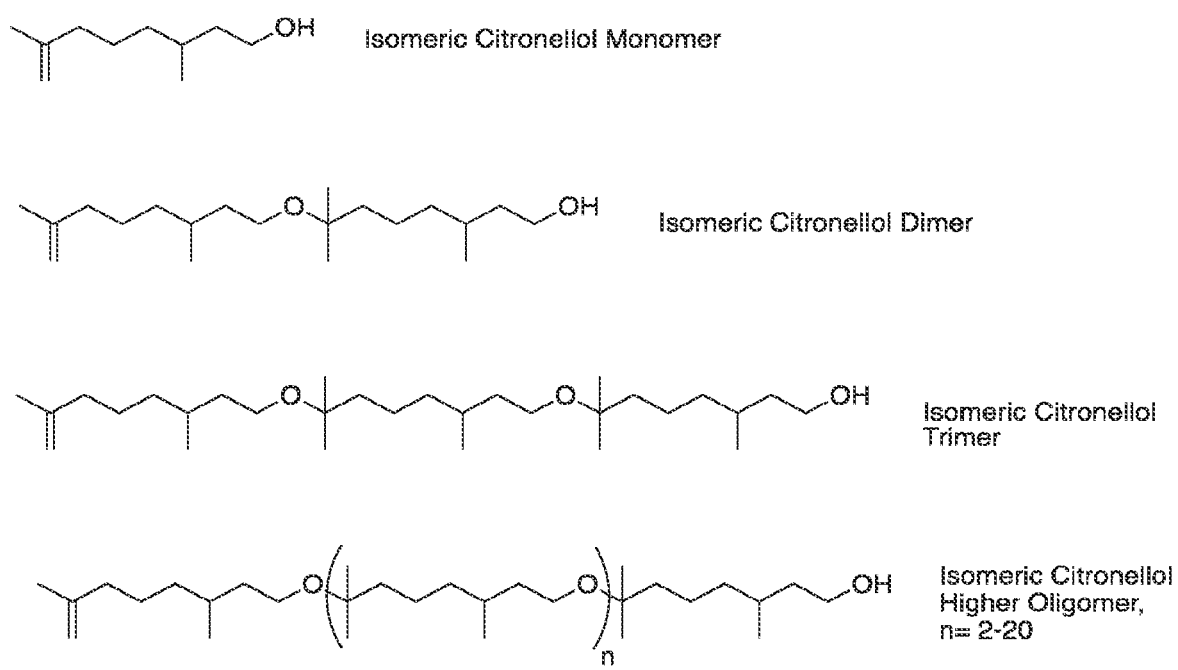
FIG. 2 provides a generic depiction of isomeric citronellol monoethers, polyethers and the isomeric citronellol monomer.
Figure 3:
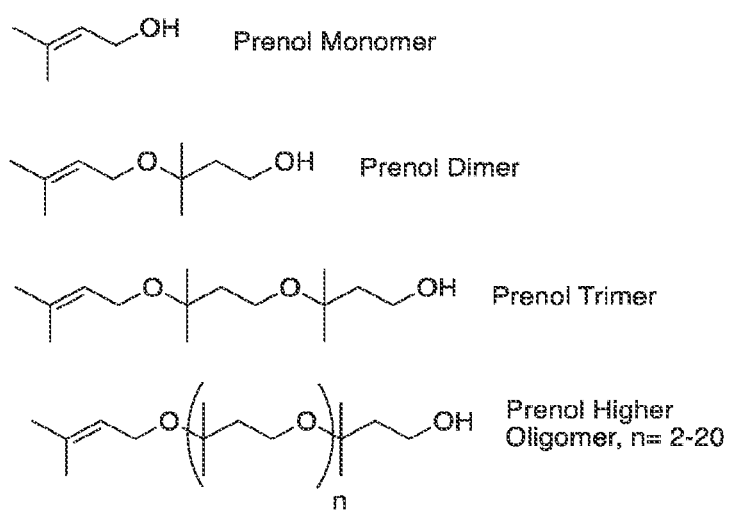
FIG. 3 provides a generic depiction of prenol monoethers, polyethers and the prenol monomer.
Figure 4:
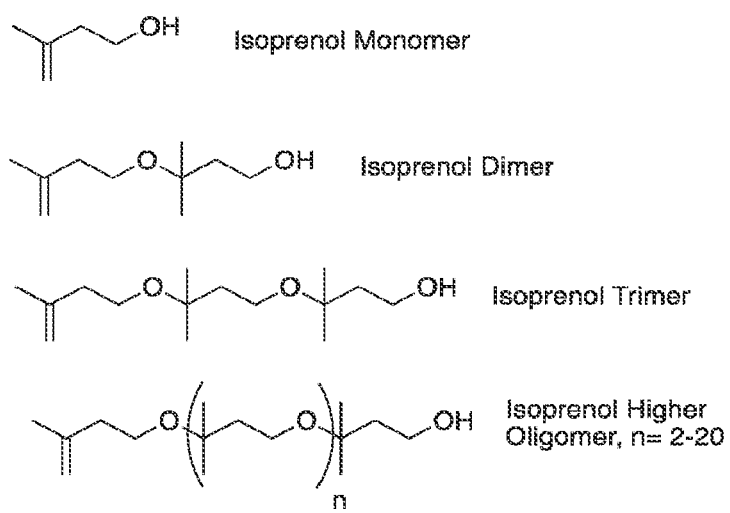
FIG. 4 provides a generic depiction of isoprenol monoethers, polyethers and the isoprenol monomer.

Without wishing to be bound by theory, isobutylenic groups can form ethers with alcohols through an acid catalyzed, mechanism. This chemistry has been used in other instances to make ether bonds in organic synthesis.

The equilibrium nature of this reaction can potentially make it challenging to produce these ethers on a large scale. However, the inventors have discovered that with monomer recycling, proper catalyst selection, and highly concentrated reaction conditions, these molecules can reach sufficient degrees of polymerization in order to be used in a number of different applications. Further, these low molecular weight polymers can be further derivatized to reach much higher molecular weights and to achieve new functionality.

Some of the monomers, dimers, trimers, and higher oligomers of the citronellol-type and prenol-type polymers are shown in FIGS. 1-4. For the purposes of this invention, the term 'citronellol' is meant to include both isomers at the olefinic position. Similarly, when the term 'prenol' is used, it is meant to include isoprenol isomers as well. In one aspect, the invention contemplates mixtures of prenol and citronellol polyethers.

While certain methods to make these ethers were described in PCT/US2015/047397 (US2017/0283553), the Applicants have now discovered that these polyethers can be made with even higher degrees of polymerization in a shorter period of time by using a resin-hound acid catalyst, such as Amberlyst®, under neat, solvent-free conditions. In one aspect, these polymerizations can be done at or below room temperature, preferably at slightly elevated temperature, between 30 and 110° C., or even more preferably between 40 and 90° C. (e.g., about 50° C.). Further, in still another aspect, these polymerizations can take place in batch reactors, semi-batch reactors, or even more preferably in continuous packed bed-type reactors of the type described in U.S. Provisional Application 62/384,939 and PCT/US2017/50808, the contents of each of which are incorporated herein by reference.

Applicants have unexpectedly found that there are unique advantages to using continuous, neat polymerization instead of traditional batch processing. In addition to the significantly shortened reaction times (e.g., seconds for continuous flow versus days for similar batch conversions), in certain cases the use of continuous, neat polymerization resulted efficient enablement of chemistry that was not observable under batch conditions. For example, in the case of isoprenol polymerization, batch conditions resulted in complicated mixtures with little apparent polymer formation, whereas under continuous reactor conditions good yields of desired homo-isoprenol polymer as the predominant product was obtained in short reaction times.

Without being bound by theory, the formation of the polyethers can occur in equilibrium under acidic conditions. Therefore, it is unfavorable for these materials to be exposed to acidic conditions during subsequent derivatization, lest depolymerization could take place.

Figure 5:
FIG. 5 provides a description of citronellol-type monomers, monoethers, and polyethers derivatized at the hydroxyl position to add or modify functionality.
Figure 5:
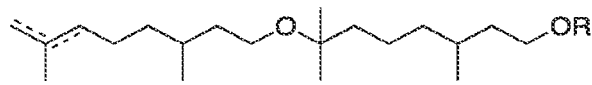
Figure 5:
Figure 5:
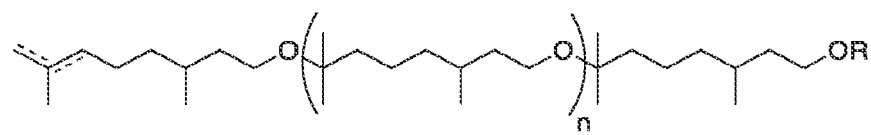
Figure 6:
FIG. 6 provides a description of renol-type monomers, monoethers, and polyethers derivatized at the hydroxyl position to add or modify functionality.
Figure 6:
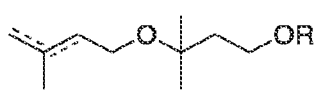
Figure 6:
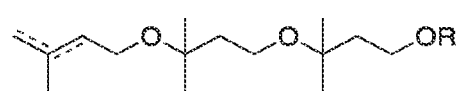
Figure 6:
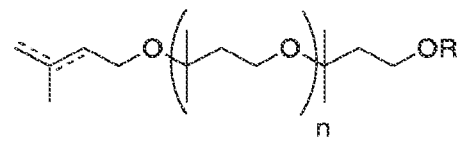

The Applicants have now discovered, however, that transesterification under basic conditions can be accomplished to generate a wide range of new and useful compositions of matter. Further, alkaline Williamson-type etherification can also be accomplished with organohalides. The functionalities that can be produced from these approaches could modify the hydrophilicity, hydrophobicity, and/or viscosity of these polyethers. Further, new functions such as UV protection, antioxidant, anti-aging, skin lightening, antimicrobial, and/or other bioactive activities can be introduced as well. Representative depictions of these modifications are shown in FIGS. 5 and 6.

Further, the applicants have discovered that the esterification of these polymers can be conducted with anhydrides, continuously, with or without catalyst present, with the simple addition of heat. Traditionally, esterifications have been performed in the presence of a catalyst such as DMAP or an acid in a solvent, often batch-wise. But due to the liquid nature of these polymers and their low volatility, these polymers can be derivatized continuously, without any solvent or catalyst present.

By way of example, acetic anhydride can be added directly to a mixture of these polymers and the mixture can be passed continuously through a heated tube or pipe at elevated temperature, and conversion to desired product can be readily realized without the addition of any catalyst or solvent. Further, fully continuous removal of any residual acetic anhydride or acetic acid byproduct can be performed under reduced pressure or at elevated temperature, and the removal of any trace acid or color can also be removed continuously with anion exchange medium or activated carbon, respectively.

The unique benefits of the compounds disclosed herein derive from one or more of the following features: the compounds are short-chain polymers; the compounds are made using a reversible polymerization reaction; the polymers are biodegradable and biocompatible; and the polymers may be manufactured using all-natural ingredients. These are important benefits in many of the commercial applications in which these compounds may be used. The compounds disclosed herein are suitable as replacement or substitutes for surfactants, polymers, and silicones in a variety of commercial products, such as in cosmetics and pharmaceutical compositions, and as adjuvants in crop care formulations, and as lubricants or solvents in enhanced oil recovery, fracking and oil field applications. The compounds disclosed herein offer improved physical characteristics, such as appearance, odor, viscosity, refractive index and/or surface tension. The nature of these compounds as short polymers of moderate molecular weight (e.g., less than 20,000 Daltons, or less than 15,000 Daltons, or less than 10,000 Daltons, or 100-10,000 Daltons, or 100-5,000 Daltons, or 1.00-3,000 Daltons, or 100-L500 Daltons).

In some embodiments of the present disclosure, the compounds disclosed herein are useful: for fragrance retention, fixation of fragrances, or as a fragrance carrier; as a malodor counteracting agent; in paints and coatings; as an adjuvant for crop control; as a cosmetic ingredient (e.g., as a silicone replacement or a white oil replacement); in nail polish; in writing or printing inks; as a resin or resin-replacement; as an insect repellant (e.g., a mosquito repellent); and in sun block formulations.

The reversibility of the polymerization of the claimed compounds derives from the nature of these polymers, having adjacent oxygen atoms and tertiary carbon atoms. As a result, under conditions which will promote the cleavage of the O—C bond, the resulting tertiary carbocation is unusually stable. This leads to facile abstraction of an adjacent hydrogen atom to regenerate the starting materials' alcohol and alkene functional groups. Such de-polymerization may be promoted by mildly acidic conditions (e.g., with Lewis acids or Bronsted acids) or by thermal conditions or by enzymatic conditions (as by enzymes found in naturally occurring bacteria).

This depolymerization property results in biodegradation. This property also permits the formation of compositions comprising the compounds wherein the depolymerization of the polymers may be controlled to permit slow release of the monomeric polymer constituents (e.g. citronellol) or of shortened polymeric constituents (e.g., the release of dimers of citronellol by depolymerization of a larger polymer). The present disclosure embraces solid and/or liquid compositions comprising the polymers according Formula I (or any of 1.1-1.43) or Formula II (or any of 2.1-2.27), wherein the formulation provides for slow, controlled depolymerization of the polymers and diffusion of the resulting monomers and or shortened oligomers so that that can be released from the composition (e.g., by vaporization at the surface of the composition). Such formulations may be comprised of ingredients which accelerate such depolymerization (such as Lewis acids or Bronsted acids, or enzymes) or such compositions may be associated with a device comprising an electrical heating element to promote thermal depolymerization. The monomers and/or shortened oligomers produce in this manner (e.g., citronellol or dimers or trimers of citronellol) are themselves beneficial for any number of reasons, e.g., as fragrances, insect repellants, anti-oxidants, anti-microbials, or as active pharmaceutical ingredients (e.g., where the composition is a pharmaceutical composition).

The compounds disclosed herein are particularly suitable for the replacement of silicones, mineral oil and/or paraffins, in cosmetic compositions, such as concealers, primers and/or moisturizers.

In a first aspect, the disclosure provides an ether compound according to Formula I (Compound 1), e.g., citronellol and prenol ethers and polyethers:

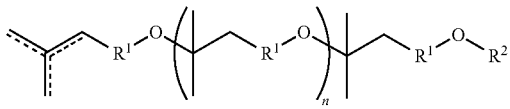

or a salt thereof, herein, $R^1$ is optionally substituted $C_1$-$C_{12}$ alkyl (e.g., $C_1$-$C_{12}$ alkyl optionally her substituted with $C_1$-$C_{12}$ alkyl or aryl);

$R^2$ is H, $C_{1-20}$alkyl (e.g., lower alkyl (e.g., $C_{1-6}$ alkyl), or $C_{1-12}$ alkyl), aryl (e.g., phenyl), aryl$C_1$-2 alkyl (e.g., benzyl), optionally unsaturated alkyl esters (e.g., C(O)—$C_{1-20}$ alkyl), or optionally substituted aryl esters (e.g., C(O)-aryl); n sis an integer between 0 and 20. It is understood that ≈≈≈≈ represents an optional double bond (i.e. either a single or double bond), and thus that the terminal group,

may have any one of the three indicated optional bonds present (i.e., a double bond) or all optional bonds absent (i.e., all single bonds).

In further embodiments of the first aspect, the disclosure provides any of the following:

1.1 Compound 1, wherein $R^1$ is optionally substituted linear $C_1$-$C_{12}$ alkyl or optionally substituted branched $C_1$-$C_{12}$ alkyl.

1.2 Compound 1, wherein $R^1$ is unsubstituted linear $C_{1-12}$ alkyl or unsubstituted branched $C_3$-$C_{12}$ alkyl.

1.3 Compound 1, wherein $R^1$ is unsubstituted linear $C_{1-12}$ alkyl.

1.4 Compound 1, wherein $R^1$ is unsubstituted branched $C_3$-$C_{12}$ alkyl.

1.5 Compound 1, wherein $R^1$ is $CH_2$.

1.6 Compound 1, wherein $R^1$ is unsubstituted branched or linear $C_6$ alkyl.

1.7 Compound 1, wherein $R^1$ is $CH_2CH_2CH(CH_3)CH_2CH_2$.

1.8 Compound 1 or any of 1.1-1.7, wherein $R^2$ is H.

1.9 Compound 1 or any of 1.1-1.7, wherein $R^2$ is alkyl (e.g., lower alkyl (e.g., $C_{1-6}$), or $C_{1-12}$).

1.10 Compound 1 or any of 1.1-1.7, wherein $R^2$ is selected from methyl, ethyl, propyl, isopropyl, n-butyl, isobutyl, sec-butyl, tert-butyl, n-pentyl, n-hexyl, n-octyl, or n-decyl.

1.11 Compound 1 or any of 1.1-1.7, wherein $R^2$ is aryl$C_1$-2 alkyl (e.g., benzyl or phenethyl).

1.12 Compound 1 or any of 1.1-1.7, wherein $R^2$ is aryl (e.g., phenyl).

1.13 Compound 1 or any of 1.1-1.7, wherein $R^2$ is an optionally unsaturated alkyl ester (e.g., C(O)—$C_{1-20}$ alkyl, or C(O)—$C_{1-6}$ alkyl).

1.14 Compound 1 or any of 1.1-1.7, wherein $R^2$ is C(O)—$C_{1-6}$ alkyl, optionally wherein $R^2$ is C(O)—$C_{1-5}$ alkyl, C(O)—$C_{1-4}$ alkyl, C(O)—$C_{1-3}$ alkyl or C(O)—$C_{1-2}$ alkyl.

1.15 Compound 1 or any of 1.1-1.7, wherein $R^2$ is C(O)—$C_{1-6}$ alkyl and said $C_{1-6}$ alkyl is selected from methyl, ethyl, propyl, isopropyl, n-butyl, isobutyl, sec-butyl, tort-butyl, n-pentyl, n-hexyl.

1.16 Compound 1 or any of 1.1-1.7, wherein $R^2$ is optionally unsaturated C(O)—$C_{7-20}$ alkyl, optionally wherein $R^2$ is optionally unsaturated C(O)—$C_{10-20}$ alkyl, C(O)—$C_{12-20}$ alkyl, C(O)—$C_{14-20}$ alkyl or C(O)—$C_{16-18}$ alkyl, or C(O)—$C_{17}$ alkyl.

1.17 Compound 1 or any of 1.1-1.7, wherein $R^2$ is mono-unsaturated C(O)—$C_{7-20}$ alkyl, optionally wherein $R^2$ is mono-unsaturated C(O)—$C_{10-20}$ alkyl, C(O)—$C_{12-20}$ alkyl, C(O)—$C_{14-20}$ alkyl or C(O)—$C_{16-18}$ alkyl, or C(O)—$C_{17}$ alkyl (e.g., oleayl).

1.18 Compound 1 or any of 1.1-1.7, wherein $R^2$ is saturated C(O)—$C_{7-20}$ alkyl, optionally wherein $R^2$ is saturated C(O)—$C_{10-20}$ alkyl, C(O)—$C_{12-20}$ alkyl, C(O)—$C_{14-20}$ alkyl or C(O)—$C_{16-18}$ alkyl, or C(O)—$C_{17}$ alkyl.

1.19 Compound 1 or any 1.1-1.18, wherein the $R^2$ substituent is a fatty acyl chain.

1.20 Compound 1 or any of 1.1-17, wherein $R^2$ is an aryl ester (e.g. C(O)-aryl), for example, benzoyl.

1.21 Compound 1 or any of 1.1-1.18, wherein the $R^2$ substituent further comprises a cationic or anionic moiety (e.g., wherein $R^2$ is alkyl, aryl, alkyl ester, or aryl ester wherein said alkyl or aryl is substituted with a cationic (e.g., quaternary ammonium) or anionic (e.g., carboxylic acid or sulfonic acid) moiety.

1.22 Compound 1 or any of 1.1-1.18, wherein $R^2$ is a polyether moiety, e.g., wherein the $R^2$ substituent comprises a polyethylene glycol chain.

1.23 Compound 1 or any of 1.1 et seq., wherein n is 1.

1.24 Compound 1 or any of 1.1 et seq., wherein n is greater than 1 (e.g., between 2 and 20).
1.2.5 Compound 1 or any of 1.1 et seq., wherein n is 2.
1.26 Compound 1 or any of 1.1 et seq., wherein n is 1, 2, 3, 4, 5, 7, 8, 9, or 10.
1.27 Compound 1 or any of 1.1 et seq., wherein n is 2 or 3.
1.28 Compound 1 or any of 1.1 et seq., wherein R' is $CH_2CH_2CH(CH_3)CH_2CH_2$, n is 1-3 (e.g. 1-2) and $R^2$ is an optionally unsaturated alkyl. ester (e.g., $C(O)$—$C_{1-20}$ alkyl, or $C(O)$—$C_1$-6 alkyl)
1.29 Compound 1.28, wherein $R^2$ is $C(O)$—$C_{1-6}$ alkyl and said $C_{1-6}$ alkyl is selected from methyl, ethyl, propyl, iso-propyl, n-butyl, isobutyl, sec-butyl, tert-butyl, n-pentyl, or n-hexyl,
1.30 Compound 1.28, wherein $R^2$ is mono-unsaturated $C(O)$—$C_{7-20}$ alkyl, optionally wherein $R^2$ is mono-unsaturated $C(O)$—$C_{10-20}$ alkyl, $C(O)$—$C_{12-20}$ alkyl, $C(O)$—$C_{14-20}$ alkyl or $C(O)$—$C_{16-18}$ alkyl, or $C(O)$—$C_{17}$ alkyl (e.g., oleayl).
1.31 Compound 1, or any of 1.1 et seq., wherein $R^2$ is an anti-aging moiety, UV-absorbing moiety, anti-oxidant moiety, hydrophobic (lipophilic) moiety, or hydrophilic moiety, described herein.
1.32 Compound 1 or any of 1.1 et seq., wherein $R^2$ is not H, alkyl (e.g., lower alkyl (e.g., $C_{1-6}$ alkyl), or $C_{1-12}$ alkyl), aryl (e.g., phenyl), $C_1$-$C_2$ alkylaryl (e.g., benzyl), optionally unsaturated alkyl esters (e.g., $C(O)$—$C_{1-20}$alkyl), or aryl esters (e.g., $C(O)$-aryl), and further embodiments of $R^2$ as described hereinabove.

1.33 Compound 1 or any of 1.1 et seq., wherein the terminal group

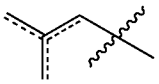

1.34 Compound 1 or any of 1.1 et seq., wherein the terminal group

1.35 Compound 1 or any of 1.1 et seq., wherein the terminal group

1.36 Compound 1 or any of 1.1 et seq., wherein the Compound of Formula I is:

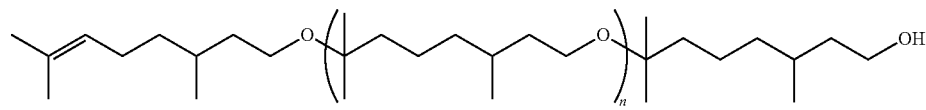

where n: 0-20 (e.g., 1-3).

1.37 Compound 1 or any of 1.1 et seq., wherein the Compound of Formula I is:

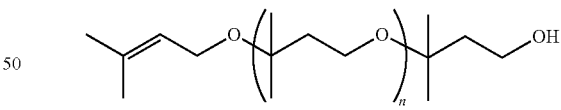

where n: 0-20 (e.g., 1-3).

1.38 Compound 1 or any of 1.1 et seq., wherein the Compound of Formula I is:

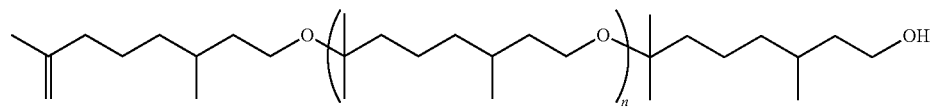

where n: 0-20 (e.g., 1-3).

1.39 Compound 1 or any of 1.1 et seq., wherein the Compound of Formula I is

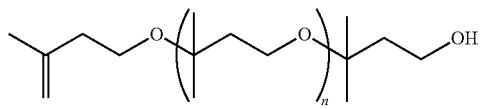

where n: 0-20 (e.g., 1-3).

1.40 Compound 1 or any of 1.1 et seq., wherein the Compound of Formula I is:

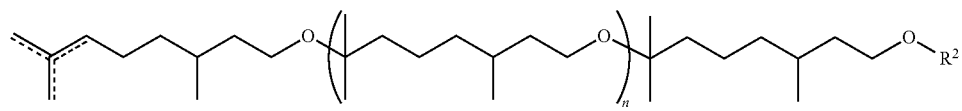

where n: 0-20 (e.g., 1-3), and wherein $R^2$ is as defined in any preceding embodiment.

1.41 Compound 1 or any of 1.1 et seq., wherein the Compound of Formula I is:

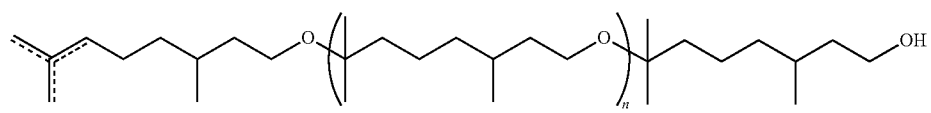

where n: 0-20 (e.g., 1-3).

1.42 Compound 1 or any of 1.1 et seq., wherein the Compound of Formula I is:

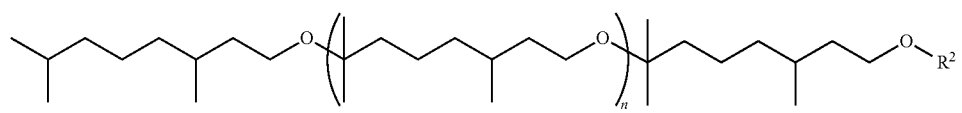

where n: 0-20 (e.g., 1-3), and wherein $R^2$ is as defined in any preceding embodiment.

1.43 Compound 1 or any of 1.1 et seq., wherein the Compound of Formula I is:

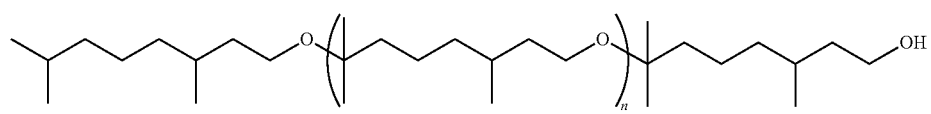

where n: 0-20 (e.g., 1-3).

As noted in the preceding paragraphs, the terminal group of the Compound of Formula Y and the Compound of Formula I is an optionally unsaturated alkyl group having the structure:

This group may thus be an isobutyl group, a 1-isobutenyl group or a 2-isobutenyl group. In some embodiments, this group is the fully saturated isobutyl group. In such embodiments, the saturated nature of this group is particularly advantageous because it provides increased chemical stability, inertness, and biocompatibility, as alkenes, especially terminal alkenes, may be prone to air oxidation and/or bioconjugation.

In second aspect, the present disclosure provides a composition (Composition 1), which composition comprises Compound 1 or any of 1.1 et seq., or Compound 2 or any of 2.1 et seq., or Compound 3 or any of 3.1 et seq., or any salts thereof, or any mixtures thereof, in combination with at least one suitable solvent, carrier, or excipient. In further embodiments of the second aspect, the present disclosure provides Compositions as follows:

1.1 A fragrance composition Compound 1 or any of 1.1 et seq., or Compound 2 or any of 2.1 et seq., or Compound 3 or any of 3.1 et seq., or a salt thereof, or any mixture thereof.

1.2 A perfume composition comprising Compound 1 or any of 1.1 et seq., or Compound 2 or any of 2.1 et seq., or Compound 3 or any of 3.1 et seq., or a salt thereof, or any mixture thereof.

1.3 A soap composition comprising Compound 1 or any of 1.1 et seq., or Compound 2 or any of 2.1 et seq., or Compound 3 or any of 3.1 et seq., or a salt thereof, or any mixture thereof.

1.4 An insect repellant composition comprising Compound 1 or any of 1.1 et seq., or Compound 2 or any of 2.1 et seq., or Compound 3 or any of 3.1 et seq., or a salt thereof, or any mixture thereof, for example, a mosquito repellant composition.

1.5 An insecticide composition comprising Compound 1 or any of 1.1 et, seq., or Compound 2 or any of 2.1 et seq., or Compound 3 or any of 3.1 et seq., or a salt thereof, or any mixture thereof.

1.6 A detergent, composition comprising Compound 1 or any of 1.1 et seq., or Compound 2 or any of 2.1 et seq., or Compound 3 or any of 3.1 et seq., or a salt thereof, or any mixture thereof.

1.7 A household cleaning agent composition comprising Compound 1 or any of 1.1 et seq., or Compound 2 or any of 2.1 et seq., or Compound 3 or any of 3.1 et seq., or a salt thereof, or any mixture thereof.

1.8 An air freshener composition comprising Compound 1 or any of 1.1 et seq., or Compound 2 or any of 2.1 et seq., or Compound 3 or any of 3.1 et seq., or a salt thereof, or any mixture thereof.

1.9 A room spray composition comprising Compound 1 or any of 1.1 et seq., or Compound 2 or any of 2.1 et seq., or Compound 3 or any of 3.1 et seq., or a salt thereof, or any mixture thereof.

1.10 A pomander composition comprising Compound 1 or any of 1.1 et seq., or Compound 2 or any of 2.1 et seq., or Compound 3 or any of 3.1 et seq., or a salt thereof, or any mixture thereof.

1.11 A candle composition comprising Compound 1 or any of 1.1 et seq., or Compound 2 or any of 2.1 et seq., or Compound 3 or any of 3.1 et seq., or a salt thereof, or any mixture thereof.

1.12 Composition 1.11, wherein the composition further comprises a paraffin wax and/or beeswax base.

1.13 Composition 1.12, wherein the composition consists of the Compound 1 or any of 1.1 et seq., or Compound 2 or any of 2.1 et seq., or Compound 3 or any of 3.1 et seq., or a salt thereof, or any mixture thereof, dispersed within the paraffin wax and/or beeswax base, with a suitable wick embedded therein.

1.14 A cosmetic composition comprising Compound 1 or any of 1.1 et seq., or Compound 2 or any of 2.1 et seq., or Compound 3 or any of 3.1 et seq., or a salt thereof, or any mixture thereof.

1.15 A toilet water composition comprising Compound 1 or any of 1.1 et seq., or Compound 2 or any of 2.1 et seq., or Compound 3 or any of 3.1 et seq., or a salt thereof, or any mixture thereof.

1.16 A pre- and aftershave lotion composition comprising Compound 1 or any of 1.1 et seq., or Compound 2 or any of 2.1 et seq., or Compound 3 or any of 3.1 et seq., or a salt thereof, or any mixture thereof.

1.17 A talcum powder composition comprising Compound 1 or any of 1.1 et seq., or Compound 2 or any of 2.1 et seq., or Compound 3 or any of 3.1 et seq., or a salt thereof, or any mixture thereof.

1.18 A hair-care product composition comprising Compound 1 or any of 1.1 et seq., or Compound 2 or any of 2.1 et seq., or Compound 3 or any of 3.1 et seq., or a salt thereof, or any mixture thereof.

1.19 A body deodorant composition comprising Compound 1 or any of 1.1 et seq., or Compound 2 or any of 2.1 et seq., or Compound 3 or any of 3.1 et seq., or a salt thereof, or any mixture thereof.

1.20 An anti-perspirant composition comprising Compound 1 or any of 1.1 et seq., or Compound 2 or any of 2.1 et seq., or Compound 3 or any of 3.1 et seq., or a salt thereof, or any mixture thereof.

1.21 A shampoo composition comprising Compound 1 or any of 1.1 et seq., or Compound 2 or any of 2.1 et seq., or Compound 3 or any of 3.1 et seq., or a salt thereof, or any mixture thereof.

1.22 A pet litter composition comprising Compound 1 or any of 1.1 et seq., or Compound 2 or any of 2.1 et seq., or Compound 3 or any of 3.1 et seq., or a salt thereof, or any mixture thereof.

1.23 A topically applied skin care composition comprising Compound 1 or any of 1.1 et seq., or Compound 2 or any of 2.1 et seq., or Compound 3 or any of 3.1 et seq., or a salt thereof, or any mixture thereof, optionally wherein the skin care application may be selected from skin-conditioning agents; skin penetration enhancing agents; skin protectants; skin soothing agents; skin healing agents; ultraviolet light absorbers or scattering agents; sequestrants; anti-acne agents; anti-androgens; depilation agents; keratolytic of desquamation agents/exfoliants such as salicylic acid; panthenol moisturizer such as D-panthenol; soluble or colloidally-soluble moisturizing agents such as hyaluronic acid and starch-grafted sodium polyacrylates; and sunscreens.

1.24 Composition 1.23, wherein the skin care application is a skin protectant.

1.25 Composition 1.23, wherein the skin care application is a skin soothing agent.

1.26 Composition 1.23, wherein the skin care application is a sunscreen.

1.27 A paint or coating composition comprising Compound 1 or any of 1.1 et seq., or Compound 2 or any of 2.1 et seq., or Compound 3 or any of 3.1 et seq., or a salt thereof, or any mixture thereof.

1.28 A lubricant composition comprising Compound 1 or any of 1.1 et seq., or Compound 2 or any of 2.1 et seq., or Compound 3 or any of 3.1 et seq., or a salt thereof, or any mixture thereof.

1.29 A plastic composition comprising Compound 1 or any of 1.1 et seq., or Compound 2 or any of 2.1 et seq., or Compound 3 or any of 3.1 et seq., or a salt thereof, or any mixture thereof.

1.30 A defoamer composition comprising Compound 1 or any of 1.1 et seq., or Compound 2 or any of 2.1 et seq., or Compound 3 or any of 3.1 et seq., or a salt thereof, or any mixture thereof.

1.31 A hydraulic fluid composition comprising Compound 1 or any of 1.1 et seq., or Compound 2 or any of 2.1 et seq., or Compound 3 or any of 3.1 et seq., or a salt thereof, or any mixture thereof.

1.32 An antimicrobial composition comprising Compound 1 or any of 1.1 et seq., or Compound 2 or any of 2.1 et seq., or Compound 3 or any of 3.1 et seq., or a salt thereof, or any mixture thereof.

1.33 A crop care formulation comprising Compound 1 or any of 1.1 et seq., or Compound 2 or any of 2.1 et seq., or Compound 3 or any of 3.1 et seq., e.g., wherein said compound is an adjuvant in the crop care formulation.

1.34 A formulation for enhanced oil recovery, fracking and/or other oil field applications comprising Compound 1 or any of 1.1 et seq., or Compound 2 or any of 2.1 et seq., or Compound 3 or any of 3.1 et seq., e.g., wherein said compound is lubricant or solvent in said formulation.

1.35 A product comprising any preceding composition wherein said composition is stored or housed in a receptacle comprising an electrical heating element, wherein actuation of the heating element results in heating of the composition, thermal decomposition of the Compound, and release of volatile substances.

1.36 A fragrance of perfume composition comprising Compound 1 or any of 1.1 et seq., or Compound 2 or any of 2.1 et seq., or Compound 3 or any of 3.1 et seq., or a salt thereof, or any mixture thereof, wherein said compound is used as a fragrance retention agent, a fragrance fixative or a fragrance carrier.

1.37 A cosmetic composition comprising Compound 1 or any of 1.1 et seq., or Compound 2 or any of 2.1 et seq., or Compound 3 or any of 3.1 et seq., or a salt thereof, or any mixture thereof, wherein said compound is used as a replacement for silicone and/or as a replacement for white oil.

1.38 A nail polish composition comprising Compound 1 or any of 1.1 et seq., or Compound 2 or any of 2.1 et seq., or Compound 3 or any of 3.1 et seq., or a salt thereof or any mixture thereof.

1.39 A writing ink or printing ink composition comprising Compound 1 or any of 1.1 et seq., or Compound 2 or any of 2.1 et seq., or Compound 3 or any of 3.1 et seq., or a salt thereof, or any mixture thereof.

1.40 An adhesive composition comprising Compound 1 or any of 1.1 et seq., or Compound 2 or any of 2.1 et seq., or Compound 3 or any of 3.1 et seq., or a salt thereof, or any mixture thereof, in admixture with one or more natural or synthetic resins.

In another embodiment, the present disclosure provides Compound 1, or any of 1.1-1.43, or Compound 2, or any of 2.1-2.27, or Compound 3, or any of 3.1-3.15, for use in Composition 1, or any of 1.1-1.40.

In a third aspect, the disclosure provides a method of making Compound 1 or any of 1.1 et seq., wherein $R^2$ is H, or a salt thereof (Method 1), wherein the method comprises the steps of (1) introducing into a reactor a compound of Formula A:

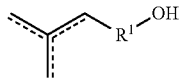

wherein, $R^1$ is optionally substituted $C_1$-$C_{12}$ alkyl (e.g., $C_1$-$C_{12}$ alkyl optionally further substituted with $C_1$-$C_{12}$ alkyl or aryl);

and (2) exposing said compound to a solid ion-exchange resin, thereby causing the polymerization of the compound of Formula A to yield a Compound 1 according to Formula

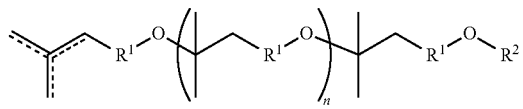

wherein, $R^1$ is optionally substituted $C_1$-$C_{12}$ (e.g., $C_1$-$C_1$ alkyl optionally further substituted with $C_1$-$C_{12}$ alkyl or aryl); and wherein $R^2$ is H and n is an integer between 0 and 20;

and (3) isolating and/or purifying (e.g., by distillation) the Compound 1, e.g., a group of related Compounds 1 wherein n varies within a range, e.g., wherein n is from 0-5, or frons 5-10, or from 10-15, or from 15-20, or wherein n has any particular value within the range of integers from 0-20.

In further embodiments of the third aspect, the disclosure provides the following:

1.1 Method 1, wherein the polymerization occurs over the ion-exchange resin at elevated temperature (e.g., between 30 and 120° C.).

1.2 Method 1.1, wherein the polymerization occurs over the ion-exchange resin at between 40 and 90° C.

1.3 Method 1.2, wherein the polymerization occurs over the ion-exchange resin at about 50° C.

1.4 Method 1 or any of 1.1-1.4, wherein the solid exchange resin is a resin-bound acid catalyst, e.g., a resin functionalized with carboxylic acid or sulfonic acid moieties.

1.5 The method of any of the preceding methods, wherein the polymerization of occurs in a batch reactor.

1.6 The method of any of the preceding methods, wherein the polymerization occurs in a continuous packed-bed reactor.

1.7 The method of any of the preceding methods, wherein the monomers of Formula A are polymerized by acid catalysis, followed by distillation and recycling of any unpolymerized monomer.

1.8 The method of any of the preceding methods, wherein the resin-bound acid catalyst is selected from Silicycle propanesulfonic acid, montmorillonite, Amberlyst® (e.g., macroreticular or cellular resins or silica covalently bonded to sulfonic acid or carboxylic acid groups).

1.9 The method of 1.7, wherein the catalyst is Amberlyst®.

1.10 The method of any of the preceding methods, wherein the Compound 1 is purified by fractional distillation.

1.11 The method of any preceding method wherein the Compound 1 is a compound 1.8, or any embodiment thereof.

1.12 The method of any of the preceding methods, further comprising the step of reacting the Compound 1 of Formula I, wherein $R^2$ is H, with a suitable reagent to convert $R^2$ to an alkyl ester or aryl ester moiety (e.g., to produce any of Compounds 1.13-1.20, or embodiments thereof), for example, wherein $R^2$ of said alkyl ester is methyl and the reaction uses ketene as the suitable reagent, or wherein $R^2$ of said alkyl ester is methyl and the reaction uses acetic anhydride as the suitable reagent, optionally in the absence of base or catalyst, and optionally under continuous conditions.

1.13 Method 1.12, wherein the esterification is an alkaline transesterification using a functionalized ester.

1.14 Method 1, or any of 1.1-1.11, further comprising the step of reacting the Compound 1 of Formula I, wherein $R^2$ is H, with a suitable reagent to form a Compound 2 of Formula H.

1.15 Method 1.14, wherein the esterification is an alkaline transesterification using a functionalized diester.

1.16 Method 1, or any of 1.1-1.11, further comprising the step of reacting the Compound 1 of Formula I, wherein $R^2$ is H, with a suitable reagent to convert $R^2$ to art alkyl ether or aryl ether moiety (e.g., to produce any of Compounds 1.9-1.12, or embodiments thereof).

1.17 Method 1.16, wherein the etherification is a Williamson-type etherification reaction using a suitable alkyl halide and a base.

1.18 Any preceding method, wherein $R^1$ is optionally substituted linear $C_1$-$C_{12}$ alkyl or optionally substituted branched $C_1$-$C_{12}$ alkyl.

1.19 Method 1 or any of 1.1-1.17, wherein $R^1$ is unsubstituted linear $C_1$-$C_{12}$ alkyl or branched $C_3$-$C_{12}$ alkyl.

1.20 Method 1 or any of 1.1-1.17, wherein $R^1$ is unsubstituted linear $C_1$-$C_{12}$ alkyl.

1.21 Method 1 or any of 1.1-1.17, wherein $R^1$ is unsubstituted branched $C_3$-$C_{12}$ alkyl.

1.22 Method 1 or any of 1.1-1.17, wherein $R^1$ is $CH_2$.
1.23 Method 1 or any of 1.1-1.17, wherein $R^1$ is unsubstituted branched or linear $C_6$ alkyl.
1.24 Method 1 or any of 1.1-1.17, wherein $R^1$ is $CH_2CH_2CH(CH_3)CH_2CH_2$.
1.25 Method 1 or any of 1.1 et seq., wherein the method also produces a Compound 3 or any of 3.1 et seq., or a salt thereof.
1.26 Method 1 or any of 1.1 et seq., wherein the method further comprises the step of reducing the terminal 1-isobutenyl or 2-isobutenyl group of a compound of Formula I to yield a compound of Formula I having a terminal isobutyl group.
1.27 Method 1.26, wherein said reduction comprises hydrogenation over a transition metal catalyst (e.g., platinum, palladium, rhodium, ruthenium, or nickel), optionally under pressure (e.g., 15-1000 psi, or 30-500 psi, 50-500 psi, 100-500 psi, 200-500 psi, 250-500 psi, 300-500 psi, 350-450 psi, or about 400 psi).
1.28 Method 1.27, wherein the reduction comprises an alcoholic solvent (e.g., methanol, ethanol, propanol, isopropanol, n-butanol, s-butanol, t-butanol, or a mixture thereof).

In a particular aspect of Method 1 or any of 1.1-1.28, as appropriate, the present disclosure further provides a method of making an ester Compound IA (Method 3), according to Formula I:

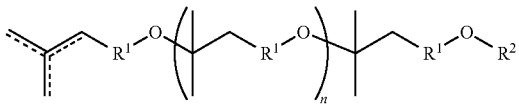

wherein, $R^1$ is optionally substituted $C_1$-$C_{12}$ alkyl (e.g., $C_1$-$C_{12}$ alkyl optionally further substituted with $C_1$-$C_{12}$ alkyl or aryl); and wherein $R^2$ is $(C=O)C_{1-4}$alkyl (e.g., methyl), and n is an integer between 0 and 20;

wherein the method comprises reacting the alcohol Compound of Formula I, wherein $R_2$ is H, with an alkyl anhydride of the formula $R_2O(C=O)OR_2$, wherein $R^2$ is $(C=O)C_{1-4}$alkyl (e.g., methyl), and wherein the reaction is conducted under continuous flow conditions (e.g., in a continuous flow reactor) in the absence of a base or catalyst.

In further embodiments of this aspect of Method 3, the present disclosure also provides:

3.1 Method 3, wherein $R^2$ is selected from methyl ethyl, n-propyl, isopropyl, n-butyl, s-butyl, isobutyl or t-butyl.
3.2 Method 3 or 3.1, wherein $R^2$ is methyl or ethyl, e.g., methyl.
3.3 Method 3 or any of 3.1-3.2, wherein n is 0-15, e.g., n is 0-10, or 1-4, or 3-6, or about 2.
3.4 Method 3 or any of 3.1-3.3, wherein the temperature of the re on is from 50° C. to 200° C. e.g., from 75° C. to 150° C. or from 100° C. to 120° C.
3.5 Method 3 or any of 3.1-3.4, wherein the reaction product from the flow reactor is recycled through the reactor at least once to improve yield, e.g., 1-5 times, e.g., about 5 times.

In still another aspect, Compound 1 et seq., e.g., as produced by Method 1, et seq., can be subjected to an additional modification that has the benefit of more than doubling the molecular weight of the mono- and polyethers. In this aspect the ethers produced according to Method 1, et seq., are subject to treatment with diacids, or even more preferably through transesterification of diesters. As is shown in Table 1, the ethers can be esterified on each side of a diacid to generate elongated and modified polymers.

Thus, in a fourth aspect, the present disclosure provides ether and polyether diester compounds, which are derivatives of the polymers of Compound 1, according to Formula II (Compound 2):

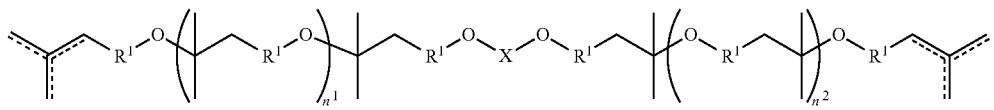

or a salt thereof, wherein,
$R^1$ is optionally substituted $C_1$-$C_{12}$ alkyl (e.g., $C_1$-$C_{12}$ alkyl optionally further substituted with $C_1$-$C_{12}$ alkyl or aryl);
$n^1$ and $n^2$ are each independently an integer between 0 and 20; and
X is a diacyl moiety of the formula —C(O)—$R^3$—C(O)—, wherein $R^3$ is optionally substituted $C_{1-22}$ alkyl, optionally substituted alkenyl or optionally substituted aryl. It is understood that ═══ represents an optional double bond (i.e. either a single or double bond), and thus that the terminal group,

may have any one of the three indicated optional bonds present (i.e., a double bond) or all optional bonds absent (i.e., all single bonds).

In further embodiments of the fourth aspect, the disclosure provides any of following:

2.1 Compound 2, wherein $R^1$ is optionally substituted linear $C_1$-$C_{12}$ alkyl or optionally substituted branched $C_1$-$C_{12}$ alkyl.
2.2 Compound 2, wherein $R^1$ is unsubstituted linear $C_1$-$C_{12}$ alkyl or branched $C_3$-$C_{12}$ alkyl. Compound 2, wherein $R^1$ is unsubstituted linear $C_1$-$C_{12}$ alkyl.
2.4 Compound 2, wherein $R^1$ is unsubstituted branched $C_3$-$C_{12}$ alkyl.
2.5 Compound 2, wherein $R^1$ is $CH_2$.
2.6 Compound 2, wherein $R^1$ is unsubstituted branched or linear $C_6$ alkyl.
2.7 Compound 2, wherein $R^1$ is $CH_2CH_2CH(CH_3)CH_2CH_2$.
2.8 Compound 2 or any of 2.1-2.7, wherein $R^3$ is unsubstituted $C_{1-22}$ alkyl, e.g., linear unsubstituted $C_{1-22}$ alkyl or branched unsubstituted $C_1$-22 alkyl.
2.9 Compound 2 or any of 2.1-2.7, wherein $R^3$ is unsubstituted $C_{1-16}$ alkyl, e.g., linear unsubstituted $C_{1-16}$ alkyl or branched unsubstituted $C_{1-16}$ alkyl.
2.10 Compound 2 or any of 2.1-2.7, wherein $R^3$ is unsubstituted $C_{1-10}$ alkyl, e.g., linear unsubstituted $C_{1-10}$ alkyl or branched unsubstituted $C_{1-10}$ alkyl.

2.11 Compound 2 or any of 2.1-2.7, wherein $R^3$ is unsubstituted $C_{1-6}$ alkyl, e.g., linear unsubstituted $C_1$-6 alkyl or branched unsubstituted $C_{1-6}$ alkyl.

2.12 Compound 2 or any of 2.1-2.7, wherein $R^3$ is selected from methylene (—CH$_{12}$—), ethylene (—CH$_2$CH$_2$—), propylene (—CH$_2$CH$_2$CH$_2$— or —CH$_2$CH(CH$_3$)—), butylene (e.g., —C$_2$CH$_2$CH$_2$CH$_2$— or —CH$_2$CH(CH$_3$)CH$_2$— or —CH(CH$_3$)CH$_2$CH$_2$—).

2.13 Compound 2 or any of 2.1-2.7, wherein $R^3$ is unsubstituted $C_{2-22}$ alkenyl, e.g., linear unsubstituted $C_{2-22}$ alkenyl or branched unsubstituted $C_{2-22}$ alkenyl, optionally wherein any of said alkenyl are mono-unsaturated.

2.14 Compound 2 or any of 2.1-2.7, wherein $R^3$ is unsubstituted $C_{2-16}$ alkenyl, e.g., linear unsubstituted $C_{2-16}$ alkenyl or branched unsubstituted $C_{2-16}$ alkenyl, optionally wherein any of said alkenyl are mono-unsaturated.

2.15 Compound 2 or any of 2.1-2.7, wherein $R^3$ is unsubstituted $C_{2-10}$ alkenyl, e.g., linear unsubstituted $C_{2-10}$ alkenyl or branched unsubstituted $C_{2-10}$ alkenyl, optionally wherein any of said alkenyl are mono-unsaturated.

2.16 Compound 2 or any of 2.1-2.7, wherein $R^3$ is unsubstituted $C_{2-6}$ alkenyl, e.g., linear unsubstituted $C_{2-6}$ alkenyl or branched unsubstituted $C_{2-6}$ alkenyl, optionally wherein any of said alkenyl are mono-unsaturated.

2.17 Compound 2 or any of 2.1-2.7, wherein $R^3$ is selected from ethylene (—CH=CH—), propylene (—CH=CHCH$_2$— or —CH$_2$C(=CH$_2$)—), butylene (e.g., —CH=CHCH$_2$CH$_2$— or —CH$_2$CH=CHCH$_2$— or —CH$_2$CH(=CH$_2$)CH$_2$—).

2.18 Compound 2 or any of 2.1-2.7, wherein $R^3$ is aryl, e.g., substituted or unsubstituted phenyl.

2.19 Compound 2 or any of 2.1 et seq., wherein $n^1$ and/or $n^2$ is 1.

2.20 Compound 2 or any of 2.1 et seq., wherein $n^1$ and/or $n^2$ is greater than 1 (e.g., between 2 and 20).

2.21 Compound 2 or any of 2.1 et seq., wherein $n^1$ and/or $n^2$ is 2.

2.22 Compound 2 or any of 2.1 et seq., wherein $n^1$ and/or $n^2$ is 1, 2, 3, 4, 5, 7, 8, 9, or 10.

2.23 Compound 2 or any of 2.1 et seq., wherein and/or $n^2$ is 2 or 3.

2.2.4 Compound 2 or any of 2.1 et seq., wherein $n^1$ and $n^2$ are the same integer.

2.25 Compound 2 or any of 2.1 et seq., wherein the terminal group

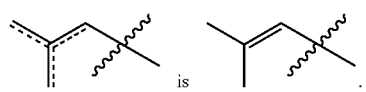

is .

2.26 Compound 2 or any of 2.1 et seq., wherein the terminal group

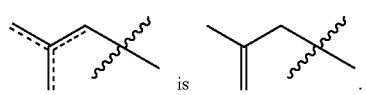

is .

2.27 Compound 2 or any of 2.1 et seq., wherein the terminal group

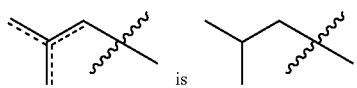

is .

In some embodiments, the Compound 2 may be described as shown in Table

TABLE 1

Examples of diesters formed from citronellol and prenol-derived oligomers.

| Structure | Description |
|---|---|
| RO–C(O)–(CH)$_n$–C(O)–OR | Diesters where R = any prenol-derived or citronellol-derived polyether and n = 1-22 |
| RO–C(O)–C$_6$H$_4$–C(O)–OR (terephthalate) | Diesters where R = any prenol-derived or citronellol-derived polyether |
| RO–C(O)–CH$_2$–C(=CH$_2$)–C(O)–OR (itaconate) | Diesters where R = any prenol-derived or citronellol-derived polyether |
| RO–C(O)–X–C(O)–OR | Diesters where R = any prenol-derived or citronellol-derived polyether and X = a C2-C20 unsaturated alkyl group |

In a fifth aspect, Compound 1 et seq., e.g., as produced by Methods 1, et seq., can form cyclic molecules during their respective polymerization reactions, where the cyclic molecules that form potentially have useful chelation, lubricity and emollient properties. In some embodiments, these compounds can be isolated through distillation or used as is. Examples of these molecules are shown in Table 2, below.

TABLE 2

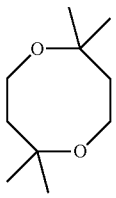

Prenol-type
Cyclic Dimer

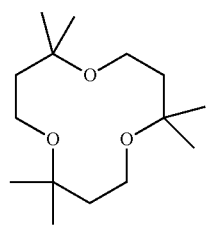

Prenol-type
Cyclic Trimer

TABLE 2-continued

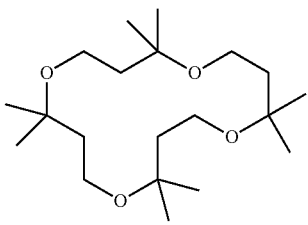

Prenol-type
Cyclic Tetramer

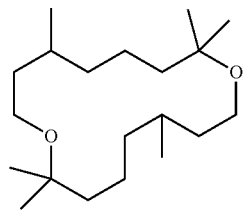 [SMILES: CC1CCCC(C)(C)OCCC(C)CCCC(C)(C)OCC1]

Citronellol-type
Cyclic Dimer

Thus, in the fifth aspect, the present disclosure provides a cyclic compound according to Formula III (Compound 3):

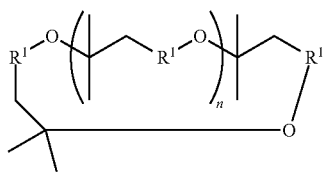

or a salt thereof, wherein, $R^1$ is optionally substituted $C_1$-$C_{12}$ alkyl (e.g., $C_1$-$C_{12}$ alkyl optionally further substituted with $C_1$-$C_{12}$ alkyl or aryl); and n is an integer between 0 and 20.

In further embodiments of the fifth aspect, the invention provides any of the following:

3.1 Compound 3, wherein $R^1$ is optionally substituted linear $C_1$-$C_{12}$ alkyl or optionally substituted branched $C_1$-$C_{12}$ alkyl.
3.2 Compound 3, wherein $R^1$ unsubstituted linear $C_1$-$C_{12}$ alkyl or branched $C_3$-$C_{12}$ alkyl.
3.3 Compound 3, wherein $R^1$ is unsubstituted linear $C_1$-$C_{12}$ alkyl.
3.4 Compound 3, wherein $R^1$ is unsubstituted branched $C_3$-$C_{12}$ alkyl.
3.5 Compound 3, wherein $R^1$ is $CH_2$,
3.6 Compound 3, wherein $R^1$ is unsubstituted branched or linear $C_5$ alkyl.
3.7 Compound 3, wherein $R^1$ is $CH_2CH_2CH(CH_3)CH_2CH_2$.
3.8 Compound 3 or any of 3.1 et seq., wherein n is 0 to 10.
3.9 Compound 3 or any of 3.1 et seq., wherein n is 0 to 5.
3.10 Compound 3 or any of 3.1 et seq., wherein n is 0.
3.11 Compound 3 or any of 3.1 et seq., wherein n is 1.
3.12 Compound 3 or any of 3.1 et seq., wherein n is 2.
3.13 Compound 3 or any of 3.1 et seq., wherein n is 0, 1, 2, 3, or 4.
3.14 Compound 3 or any of 3.1 et seq., wherein n is 0, 1, 2 or 3.
3.15 Compound 3 or any of 3.1 et seq., wherein n is 0, 1, or 2.

In some embodiments, UV absorbing moieties include, but are not limited to, conjugated aromatic esters, conjugated aromatic ethers, and conjugated olefins. Specific examples include, but are not limited to, cinnamic acid, cinnamic acid derivatives, salicylic acid, salicylic acid derivatives, dimethylaminobenzoic acid, para-aminobenzoic acid, benzoic acid, 3,3-diphenylcyanoacrylate, diethylamino hydroxybenzoyl benzoate, and methoxycinnamic acid.

In some embodiments, the anti-aging and/or antioxidant moieties include, but are not limited to, hyaluronic acid, ascorbic acid, azelaic acid, carnosine, glycolic acid, nicotinic acid, phenolic acids, phenol ethers, benzophenones, sulfites, sulfones, sulfonates, and phosphates.

In some embodiments, hydrophobic moieties include acetate, propionate, linear or branched fatty acids, linear or branched alkyl chains, organosilicones, fluoroalkanes, and graphene derivatives. Hydrophilic moieties include sulfonates, ethoxylates, polyglycerol, polypropylene glycol, carbohydrates, and, carboxylic acids, and other polyols.

Compound 1 et seq., e.g., citronellol and prenol polyethers, for example, as produced according to Method 1, et seq., could also be connected to (e.g., esterified or etherified to) other biologically active molecules, such as antimicrobial compounds, pharmaceutical compounds, skin-healing compounds, and sentient molecules, such as cooling agents, anti-inflammatory agents, and/or warming agents.

Compound 1, et seq., Compound 2, et seq., and Compound 3, et seq., e.g., as produced by Method 1, et seq., could be used for many applications. They can be used in cosmetic formulations, in paints or coatings, in personal care products, in household products, e.g., in cleaning products, in electronics, in lubricants, in plastics, in defoamers, in enhanced oil and gas recovery (including fracking and other oil field applications), in pharmaceutical applications, in crop care formulations, and in hydraulic fluids. The compounds disclosed herein are suitable as replacements or substitutes for surfactants, polymers, silicones, and solvents in these various applications. These materials, particularly the lower molecular weight molecules, can also be used beneficially as insect repellents. For example, Compound 1, et seq., Compound 2, et seq., and Compound 3, et seq., e.g., as produced by the methods of Method 1 et seq., can be used or incorporated with insecticides, insect-repellent and bioactive ingredients. In some embodiments, Compound 1, et seq., Compound 2, et seq., and Compound 3, et seq., e.g., as produced by the methods of Method 1 et seq., may be particularly useful for fragrance retention, fixation of fragrances, or as a fragrance carrier; as a malodor counteracting agent; in paints and coatings; as an adjuvant for crop control; as a cosmetic ingredient (e.g., as a silicone replacement or a white oil replacement); in nail polish; in writing or printing inks; as a resin or resin-replacement; as an insect repellant (e.g., a mosquito repellent); and in sun block formulations.

In a sixth aspect the, the present disclosure provides a method of using Compound 1 et seq., Compound 2, et seq., and/or Compound 3, et seq., e/g., a Compound of Formula I, produced by Method 1, et seq., in a composition (e.g., Composition 1, et seq., for example, a fragrance composition, perfume, soap, insect repellant and insecticide, detergent, household cleaning agent, air freshener, room spray, pomander, candle, cosmetic, toilet water, pre- and aftershave lotion, talcum powder, hair-care product, body deodorant, anti-perspirant, shampoo, skin care applications, pharmaceuticals, antimicrobials, pet litter, crop care formulation, or oil field, fracking or enhanced oil recovery formation).

Thus, the present disclosure provides a method (Method 2) of using Compound 1, or any of 1.1-1.43, or Compound 2, or any of 2.1-2.27, or Compound 3, or any of 3.1-3.15, or any combination thereof, in the manufacture of Composition 1, or any of Compositions 1.1-1.40.

In further embodiments of the sixth aspect, Method 2 may provide any of the following:

2.1 The method of Method 2, wherein any of Compound 1-1.43 (e.g., a citronellol and/or prenol polymer of Formula I), or Compound 2-2.27, or Compound 3-3.15, is used in a fragrance composition.

2.2 The method of Method 2, wherein any of Compound 1-1.43 (e.g., a citronellol and/or prenol polymer of Formula I), or Compound 2-2.27, or Compound 3-3.15, is used in a perfume.

2.3 The method of Method 2, wherein any of Compound 1-1.43 (e.g., a citronellol and/or prenol polymer of Formula I), or Compound 2-2.27, or Compound 3-3.15, is used in a soap.

2.4 The method of Method 2, wherein any of Compound 1-1.43 (e.g., a citronellol and/or prenol polymer of Formula I), or Compound 2-2.27, or Compound 3-3.15, is used in an insect repellant.

2.5 The method of Method 2, wherein any of Compound 1-1.43 (e.g., a citronellol and/or prenol polymer of Formula I), or Compound 2-2.27, or Compound 3-3.15, is used in an insecticide.

2.6 The method of Method 2, wherein any of Compound 1-1.43 (e.g., a citronellol and/or prenol polymer of Formula I), or Compound 2-2.27, or Compound 3-3.15, is used in a detergent.

2.7 The method of Method 2, wherein any of Compound 1-1.43 (e.g., a citronellol and/or prenol polymer of Formula T), or Compound 2-2.27, or Compound 3-3.15, is used in a household cleaning agent.

2.8 The method of Method 2, wherein any of Compound 1-1.43 (e.g., a citronellol and/or prenol polymer of Formula I), or Compound 2-2.27, or Compound 3-3.15, is used in an air freshener.

2.9 The method of Method 2, wherein any of Compound 1-1.43 (e.g., a citronellol and/or prenol polymer of Formula I), or Compound 2-2.27, or Compound 3-3.15, is used in a room spray.

2.10 The method of Method 2, wherein any of Compound 1-1.43 (e.g., a citronellol and/or prenol polymer of Formula I), or Compound 2-2.27, or Compound 3-3.15, is used in a pomander.

2.11 The method of Method 2, wherein any of Compound 1-1.43 (e.g., a citronellol and/or prenol polymer of Formula I), or Compound 2-2.27, or Compound 3-3.15, is used in a candle.

2.12 The method of Method 2, wherein any of Compound 1-1.43 (e.g., a citronellol and/or prenol polymer of Formula I), or Compound 2-2.27, or Compound 3-3.15, is used in a cosmetic.

2.13 The method of Method 2, wherein any of Compound 1-1.43 (e.g., a citronellol and/or prenol polymer of Formula I), or Compound 2-2.27, or Compound 3-3.15, is used in a toilet water.

2.14 The method of Method 2, wherein any of Compound 1-1.43 (e.g., a citronellol and/or prenol polymer of Formula I), or Compound 2-2.27, or Compound 3-3.15, is used in a pre- and aftershave lotion.

2.15 The method of Method 2, wherein any of Compound 1-1.43 (e.g., a citronellol and/or prenol polymer of Formula I), or Compound 2-2.27, or Compound 3-3.15, is used in a talcum powder.

2.16 The method of Method 2, wherein any of Compound 1-1.43 (e.g., a citronellol and/or prenol polymer of Formula I), or Compound 2-2.27, or Compound 3-3.15, is used in a hair-care product.

2.17 The method of Method 2, wherein any of Compound 1-1.43 (e.g., a citronellol and/or prenol polymer of Formula I), or Compound 2-2.27, or Compound 3-3.15, is used in a body deodorant.

2.18 The method of Method 2, wherein any of Compound 1-1.43 (e.g., a citronellol and/or prenol polymer of Formula I), or Compound 2-2.27, or Compound 3-3.15, is used in an anti-perspirant.

2.19 The method of Method 2, wherein any of Compound 1-1.43 (e.g., a citronellol and/or prenol polymer of Formula I), or Compound 2-2.27, or Compound 3-3.15, is used in a shampoo.

2.20 The method of Method 2, wherein any of Compound 1-1.43 (e.g., a citronellol and/or prenol polymer of Formula I), or Compound 2-2.27, or Compound 3-3.15, is used in a pet litter.

2.21 The method of Method 2, wherein any of Compound 1-1.43 (e.g., a citronellol and/or prenol polymer of Formula I, produced by Method 1, et seq), or Compound 2-2.27, or Compound 3-3.15, is used in a topically applied in a skin care application, wherein the skin care application may be selected from skin-conditioning agents; skin penetration enhancing agents; skin protectants; skin soothing agents; skin healing agents, ultraviolet light absorbers or scattering agents; sequestrants; anti-acne agents; anti-androgens; depilation agents; keratolytic agents/desquamation agents/exfoliants such as salicylic acid; panthenol moisturizer such as D-panthenol; soluble or colloidally-soluble moisturizing agents such as hyaluronic acid and starch-grafted sodium polyacrylates; and sunscreens.

2.22 The method of Method 2.21, wherein the skin care application is a skin protectant.

2.23 The method of Method 2.21, wherein the skin care application is a skin soothing agent.

2.24 The method of Method 2.21, wherein the skin care application is a sunscreen.

2.25 The method of Method 2, wherein any of Compound 1-1.43 (e.g., a citronellol and/or prenol polymer of Formula I), or Compound 2-2.27, or Compound 3-3.15, is used in a paint or coating.

2.26 The method of Method 2, wherein any of Compound 1-1.43 (e.g., a citronellol and/or prenol polymer of Formula I), or Compound 2-2.27, or Compound 3-3.15, is used in a lubricant.

2.27 The method of Method 2, wherein any of Compound 1-1.43 (e.g., a citronellol and/or prenol polymer of Formula T), or Compound 2-2.27, or Compound 3-3.15, is used in a plastic.

2.28 The method of Method 2, wherein any of Compound 1-1.43 (e.g., a citronellol and/or prenol polymer of Formula I), or Compound 2-2.27 or Compound 3-3.15, is used in a pharmaceutical.

2.29 The method of Method 2, wherein any of Compound 1-1.43 (e.g., a citronellol and/or prenol polymer of Formula I), or Compound 2-2.27, or Compound 3-3.15, is used in a crop care formulation, e.g., wherein said compound is an adjuvant in the crop care formulation.

2.30 The method of Method 2, herein any of Compound 1-1.43 (e.g., a citronellol and/or prenol polymer of Formula I), or Compound 2-2.27, or Compound 3-3.15, is used in a formulation for enhanced oil recovery, (racking and/or other oil field applications, e.g., wherein said compound is lubricant or solvent in said formulation.

2.31 The method of Method 2, wherein any of Compound 1-1.43 (e.g., a citronellol and/or prenol polymer of Formula I), or Compound 2-2.2.7, or Compound 3-3.15, is used as a fragrance retention agent, a fragrance fixative or as a fragrance carrier (e.g., in a fragrance composition or a perfume composition).

2.32 The method of Method 2, wherein any of Compound 1-1.43 (e.g., a citronellol and/or prenol polymer of Formula I), or Compound 2-2.27, or Compound 3-3.15, is used as a silicone replacement and/or as a white oil replacement (e.g., in a cosmetic composition).

2.33 The method of Method 2, wherein any of Compound 1-1.43 (e.g., a citronellol and/or prenol polymer of Formula I), or Compound 2-2.27, or Compound 3-3.15, is used in a nail polish composition.

2.34 The method of Method 2, wherein any of Compound 1-1.43 (e.g., a citronellol and/or prenol polymer of Formula I), or Compound 2-2.27, or Compound 3-3.15, is used in a writing ink or printing ink composition.

2.35 The method of Method 2, wherein any of Compound 1-1.43 (e.g., a citronellol and/or prenol polymer of Formula I), or Compound 2-2.27, or Compound 3-3.15, is used in an adhesive composition (e.g., in admixture with one or more natural or synthetic resins).

2.36 The method of Method 2, wherein any of Compound 1-1.43 (e.g., a citronellol and/or prenol polymer of Formula T), or Compound 2-2.27, or Compound 3-3.15, is used as a malodor counteracting agent (e.g., in a fragrance, perfume, antiperspirant, deodorant, or other personal care composition).

In a further aspect, any of Compound 1-1.43 (e.g., a citronellol and/or prenol polymer of Formula I) may be used in a method for enhanced oil and gas recovery.

An added benefit of these materials described herein is that they are expected to be fully biodegradable and biocompatible.

During the course of the evaluation of these polyethers, it was surprisingly observed that the depolymerization back to monomer would spontaneously occur at ~180° C. for the citronellol-type polymers. This thermal depolymerization property, or similar enzymatic and/or, acid catalyzed depolymerization properties could be beneficially used to deliver citronellol monomer in a controlled fashion over time.

In one aspect, thermal depolymerization could be used to deliver monomer into the air in a controlled release. In one aspect, the invention contemplates using the compounds of Compound 1, et seq., and/or Compound 2, et seq., e.g., as produced by Method 1, et seq., e.g., in candles or thermal dispensers used for odor control and/or mosquito control, in low pH industrial cleaners which could have the depolymerized monomer ingredient released over time to promote beneficial odor, and laundry detergents that could use enzymes to digest the polymers over time to have fresh odor over longer periods.

In another aspect, the fragrance compositions of the present application, comprising the compounds of Compound 1, et seq., and/or Compound 2 or 3, et seq., e.g., as produced by Method 1, et seq., and the fragrance composition is selected from: perfumes, soaps, insect revenants and insecticides, detergents, household cleaning agents, air fresheners, room sprays, pomanders, candles, cosmetics, toilet waters, pre- and aftershave lotions, talcum powders, hair-care products, body deodorants, anti-perspirants, shampoo, cologne, shower gel, hair spray and pet litter.

In another aspect, the compounds of Compound 1, et seq., and/or Compound 2 or 3, et seq., e.g., as produced by Method 1, et seq., may be used in an antifungal composition. In aspect the antifungal composition comprises a polyethers of Compound 1, et seq., and/or Compound 2 or 3, et seq., e.g., as produced by Method 1, et seq., and at least one type of compound that demonstrates synergistic effects in the presence of the above fragrance component selected from the group consisting of aliphatic or aromatic aldehydes, aliphatic or aromatic alcohols, acetal and ester, thereby making it possible to reduce the contained amounts of active ingredients to a lower amount than in the case of using each alone.

In another aspect the compounds of Compound 1, et seq., and/or Compound 2 or 3, et seq., e.g., as produced by Method 1, et seq., may be used topically applied in a skin care application. For example, the skin care application may be selected from skin-conditioning agents; skin penetration enhancing agents; skin protectants; skin soothing agents; skin healing agents; ultraviolet light absorbers or scattering agents; sequestrants; anti-acne agents; anti-androgens; depilation agents; keratolytic agents/desquamation agents/exfoliants such as salicylic acid; panthenol moisturizer such as D-panthenol; soluble or colloidally-soluble moisturizing agents such as hyaluronic acid and starch-grafted sodium polyacrylates; and sunscreens.

In another aspect, the mono- and/or polyethers of Compound 1, et seq., and/or Compound 2 or 3, et seq., e.g., as produced by Method 1 et seq., may be used in a delivery system, for example, in any fragrance delivery system in which a prolonged, defined release of the above-mentioned fragrant compounds is desired. For example, fragrance delivery systems as described herein may be used, e.g., in functional perfumery, in articles which are exposed to daylight when in use or which are applied to other articles which thereafter are exposed to daylight.

Further embodiments, the present disclosure provides Delivery System 4.0 which includes, e.g., air-fresheners in liquid and solid form which, with the delivery system of the present invention. Still further examples include delivery systems which deliver window and household cleaners, all purpose-cleaners and furniture polish. The surfaces which have been cleaned with such cleaners. In a further example, the delivery system includes detergents and fabric softeners can also contain the delivery system of the present invention, and the clothes washed or treated with such detergents or softeners.

In still another aspect the mono- and/or polyethers of Compound 1, et Seq., and/or Compound 2 or 3, et seq., e.g., as produced by Method 1 et seq., may be used in a drug delivery system. In certain embodiments, the Delivery system 4.0 may comprise any of the following Delivery systems:

4.1 A drug delivery system comprising a Compound of Formula I of any of Compounds 1-36, (e.g., a citronellol and/or prenol polymer of Formula I), Compounds 2-2.27, or Compounds 3-3.15, or any salt thereof, or mixtures thereof.

4.2 A fragrance delivery system comprising a Compound of Formula I of any of Compounds 1-36, (e.g., a citronellol and/or prenol polymer of Formula I), Compounds 2-2.27, or Compounds 3-3.15, or any salt thereof, or mixtures thereof.

4.3 A detergent delivery system comprising a Compound of Formula of any of Compounds 1-36, (e.g., a citronellol and/or prenol polymer of Formula I), Compounds 2-2.27, or Compounds 3-3.15, or any salt thereof, or mixtures thereof.

4.4 A household cleaner delivery system comprising a Compound of Formula I of any of Compounds 1-36, (e.g., a citronellol and/or prenol polymer of Formula I), Compounds 2-2.27, or Compounds 3-3.15, or any salt thereof, or mixtures thereof.

In another aspect, the present invention further provides a method of epoxidizing the double bond of any Compound according to Formula Y, for example any Compound 1-1.43 (e.g., a citronellol and/or prenol polymer of Formula I), or Compound 2-2.27, to form an epoxide. Such epoxide derivative may be useful for any of the uses disclosed herein for any Compound 1 or 1.1-1.43, or Compound 2 or 2.1-2.27, and may be used in any method described by Method 2 or any of 2.1 to 2.36. Such epoxide derivative may also be useful as an intermediate to produce further compounds which themselves may be useful for any of the uses disclosed herein for any Compound 1 or 1.1-1.43, or Compound 2 or 2.1-2.27, and may be used in any method described by Method 2 or any of 2.1 to 2.36.

For example, in an embodiment of this aspect, the present invention provides a method of epoxidizing a Compound 1, as hereinbefore described, to yield an epoxide Compound 1E:

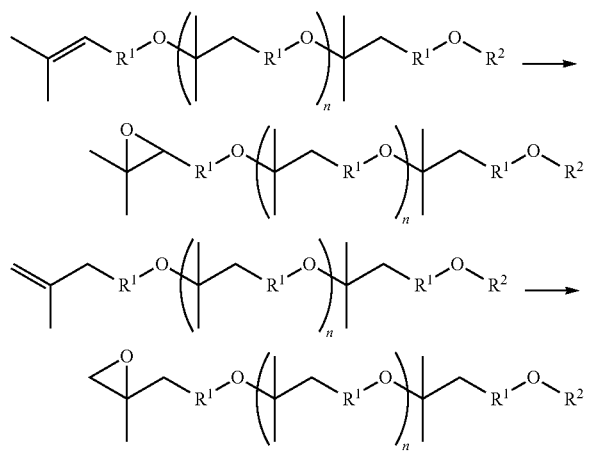

Such an epoxide may be useful, for example, as an intermediate in epoxide ring opening reactions, to yield polymer derivatives such as ethers, amines and esters, which may be useful for any of the uses disclosed herein for any Compound 1 or 1.1-1.43, or Compound 2 or 2.1-2.27, and may be used in any method described by Method 2 or any of 2.1 to 2.36. Such ring opening reactions include, but are not limited to, hydrolysis, alcoholysis, aminolysis, and carboxylate ring openings. Thus, for example, such ring opening reactions may generate products as follows (or any double-bond addition regioisomers thereof):

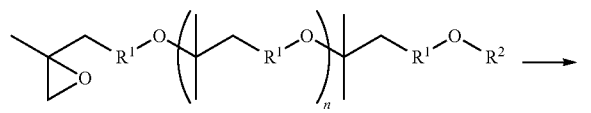

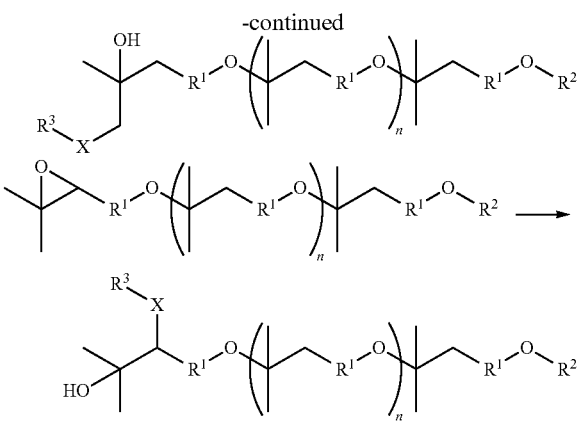

wherein $R^1$ and $R^2$ are as defined for Compound 1, and wherein X is O, NH, or $NR^3$, and $R^3$ is optionally substituted $C_1$-$C_{12}$ alkyl.

The details of one or more embodiments of the invention are set forth in the accompanying description below. Unless defined otherwise, all technical and scientific terms used herein have the same meaning as commonly understood by one of ordinary skill in the art to which this invention belongs. In the case of conflict, the present specification will control.

Unless otherwise indicated, it is to be understood that the terminology used herein is for the purpose of describing particular embodiments only and is not intended to be limiting. In this specification and in the claims that follow, reference will be made to a number of terms, which shall be defined to have the definitions set forth below.

As used herein, the singular forms "a," "an," and "the" include plural referents unless the context clearly dictates otherwise. Thus, for example, reference to "a reactant" includes not only a single reactant but also a combination or mixture of two or more different reactant, reference to "a substituent" includes a single substituent as well as two or more substituents, and the like.

As used herein, the phrases "for example," "for instance," "such as," or "including" are meant to introduce examples that further clarify more general subject matter. These examples are provided only as an aid for understanding the disclosure, and are not meant to be limiting in any fashion. Furthermore, as used herein, the terms "may," "optional," "optionally," or "may optionally" mean that the subsequently described circumstance may or may not occur, so that the description includes instances where the circumstance occurs and instances where it does not. For example, the phrase "optionally present" means that an object may or may not be present, and, thus, the description includes instances wherein the object is present and instances wherein the object is not present.

As used herein, the phrase "having the formula" or "having the structure," is not intended to be limiting and is used in the same way that the term "comprising" is commonly used.

In some formulae of the present application, one or more chiral centers are identified by an asterisk placed next to the chiral carbon. In other formulae, no chiral center is identified, but the chiral isomers are nonetheless covered by these formulae.

Some compounds of the present invention can exist in a tautomeric form which is also intended to be encompassed within the scope of the present invention.

"Tautomers" refers to compounds whose structures differ markedly in arrangement of atoms, but which exist in easy and rapid equilibrium. It is to be understood that the compounds of the invention may be depicted as different tautomers. It should also be understood that when compounds have tautomeric forms, all tautomeric forms are intended to be within the scope of the invention, and the naming of the compounds does not exclude any tautomeric form. Further, even though one tautomer may be described, the present invention includes all tautomers of the present compounds.

As used herein, the term "salt" can include acid addition salts including hydrochlorides, hydrobromides, phosphates, sulfates, hydrogen sulfates, alkylsulfonates, arylsulfonates, acetates, benzoates, citrates, maleates, fumarates, succinates, lactates, and tartrates; alkali metal cations such as $Na^+$, $K^{30}$, Li+, alkali earth metal salts such as $Mg^{2+}$ or $Ca^{2+}$, or organic amine salts, or organic phosphonium salts.

The term "alkyl" as used herein refers to a monovalent or bivalent, branched or unbranched saturated hydrocarbon group having from 1 to 22 carbon atoms, typically although, not necessarily, containing 1 to about 12 carbon atoms, such as triethyl, ethyl, n-propyl, isopropyl, n-butyl, isobutyl, t-butyl, octyl, and the like.

The term "alkenyl" as used herein refers to a monovalent or bivalent, branched or unbranched, unsaturated hydrocarbon group typically although not necessarily containing 2 to about 12 carbon atoms and 1-10 carbon-carbon double bonds, such as ethylene, n-propylene, isopropylene, n-butylene, isobutylene, t-butylene, octylene, and the like.

The term "alkynyl" as used herein refers to a monovalent or bivalent, branched or unbranched, unsaturated hydrocarbon group typically although not necessarily containing 2 to about 12 carbon atoms and 1-8 carbon-carbon triple bonds, such as ethyne, propyne, butyne, pentyne, hexyne, heptyne, octyne, and the like.

The term "aryl" as used herein refers to an aromatic hydrocarbon moiety comprising at least one aromatic ring of 5-6 carbon atoms, including, for example, an aromatic hydrocarbon having two fused rings and 10 carbon atoms (i.e, naphthalene).

By "substituted" as in "substituted alkyl," "substituted alkenyl," "substituted alkynyl," and the like, it is meant that in the alkyl, alkenyl, alkynyl, or other moiety, at least one hydrogen atom bound to a carbon atom is replaced with one or more non-hydrogen substituents, e.g., by a functional group.

The terms "branched" and "linear" (or "unbranched") when used in reference to, for example, an alkyl moiety of $C_a$ to $C_b$ carbon atoms, applies to those carbon atoms defining the alkyl moiety. For example, for a $C_4$ alkyl moiety, a branched embodiment thereof would include an isobutyl, whereas an unbranched embodiment thereof would be an n-butyl. However, an isobutyl would also qualify as a linear $C_3$ alkyl moiety (a propyl) itself substituted by a $C_1$ alkyl (a methyl).

Examples of functional groups include, without limitation: halo, hydroxyl, sulfhydryl, $C_1$-$C_{24}$ alkoxy, $C_2$-$C_{24}$ alkenyloxy, alkynyloxy, $C_5$-$C_{20}$ aryloxy, acyl (including alkylcarbonyl (—CO-alkyl) and $C_6$-$C_{20}$ arylcarbonyl (—CO-aryl)), acyloxy (—O-acyl), $C_2$-$C_{24}$ alkoxycarbonyl (—(CO)—O-alkyl), $C_6$-$C_{20}$ aryloxycarbonyl (—(CO)—O-aryl), halocarbonyl (—CO)—X where X is halo), $C_2$-$C_{24}$ alkylcarbonato (—O—(CO)—O-alkyl), $C_6$-$C_{20}$ arylcarbonato (—O—(CO)—O-aryl), carboxy (—COOH), carboxylato (—COO$^-$), carbamoyl (—(CO)—NH$_2$), mono-substituted $C_1$-$C_{24}$ alkylcarbamoyl (—(CO)—NH($C_1$-$C_{24}$ alkyl)), di-substituted alkylcarbamoyl (—(CO)—N($C_1$-$C_{24}$ alkyl)$_2$), mono-substituted arylcarbamoyl (—(CO—NH-aryl), thiocarbarnoyl (—(CS)—NH$_2$), carbamido (—NH—(CO)—NH$_2$), cyano (—C≡N), isocyano (—N$^+$≡C$^-$), cyanato (—O—C≡N), isocyanate (—O—N$^+$≡C$^-$), isothiocyanato (—S—C≡N), azido (—N=N$^{30}$=N$^-$), formyl (—(CO)—H), thioformyl (—(CS)—H), amino (—NH$_2$), mono- and di-($C_1$-$C_{24}$ alkyl)-substituted amino, mono- and di-($C_5$-$C_{70}$ aryl)-substituted amino, $C_2$-$C_{24}$ alkylamido (—NH—(CO)-alkyl), $C_5$-$C_{20}$ arylamido (—NR—(CO)-aryl), imino (—CR=NH where R=hydrogen, $C_5$-$C_{20}$ aryl, $C_6$-$C_{20}$ alkaryl, $C_6$-$C_{20}$ aralkyl, etc.), alkylimino (—CR=N(alkyl), where R=hydrogen, alkyl, aryl, alkaryl, etc.), arylimino (—CR=N(aryl), where R=hydrogen, alkyl, aryl, alkaryl, etc.), nitro (—NO$_2$), nitroso (—NO), sulfo (—SO$_2$—OH), sulfonato (—SO$_2$—O$^-$), $C_1$-$C_{24}$ alkylsulfanyl (—S-alkyl; also termed "alkylthio"), arylsulfanyl (—S-aryl; also termed "arylthio"), $C_1$-$C_{24}$ alkylsulfinyl (—(SO)-alkyl), $C_5$-$C_{20}$ arylsulfinyl (—(SO)-aryl), $C_{1-24}$ alkylsulfonyl $C_5$-$C_{20}$ arylsulfonyl (—SO$_2$-aryl), phosphono (—P(O)(OH)$_2$), phosphonato (—P(O)(O)$_2$), phosphinato (—P(O)(O)), phospho (—PO$_2$), phosphino (—PH$_2$), mono- and di-($C_1$-$C_{24}$ alkyl)-substituted phosphino, mono- and di-($C_5$-$C_{20}$ aryl)-substituted phosphino; and the hydrocarbyl moieties such as $C_1$-$C_{24}$ alkyl (including $C_1$-$C_{18}$ alkyl, further including $C_1$-$C_{12}$ alkyl, and further including $C_1$-$C_6$ alkyl), $C_2$-$C_{24}$ alkenyl (including $C_2$-$C_{18}$ alkenyl, further including $C_2$-$C_{12}$ alkenyl, and further including $C_2$-$C_6$ alkenyl), alkynyl (including $C_2$-$C_{18}$ alkynyl, further including $C_2$-$C_{12}$ alkynyl, and further including $C_2$-$C_6$ alkynyl), $C_5$-$C_{30}$ aryl (including $C_5$-$C_{20}$ aryl, and further including $C_5$-$C_{12}$ aryl), and $C_6$-$C_{30}$ aralkyl (including $C_6$-$C_{20}$ aralkyl, and further including $C_6$-$C_{12}$ aralkyl). In addition, the aforementioned functional groups may, if a particular group permits, be further substituted with one or more additional functional groups or with one or more hydrocarbyl moieties such as those specifically enumerated above. For example, the alkyl or alkenyl group may be branched. For example, the "substituent" is an alkyl group, e.g., a methyl group.

As used herein, the term "fragrance composition" means a mixture of fragrance ingredients, e.g., including the polyether compounds of Method 1, et seq., and Method 2, et seq., including auxiliary substances if desired, dissolved in a suitable solvent or mixed with a powdery substrate used to provide a desired odor to a product.

The polyether compounds of Compound 1, et seq., Method 1, et seq., and Method 2, et seq. may be used with e.g., with: perfumes, soaps, insect repellants and insecticides, detergents, household cleaning agents, air fresheners, room sprays, pomanders, candles, cosmetics, toilet waters, pre- and aftershave lotions, talcum powders, hair-care products, body deodorants, anti-perspirants, shampoo, cologne, shower gel, hair spray, and pet litter.

Fragrance and ingredients and mixtures of fragrance ingredients that may be used in combination with the disclosed compound for the manufacture of fragrance compositions include, hut are not limited to, natural products including extracts, animal products and essential oils, absolutes, resinoids, resins, and concretes, and synthetic fragrance materials which include, but are not limited to, alcohols, aldehydes, ketones, ethers, acids, esters, acetals, phenols, ethers, lactones, furansketals, nitriles, acids, and hydrocarbons, including both saturated and unsaturated compounds and aliphatic carbocyclic and heterocyclic compounds, and animal products.

As used herein, "citronellol polymer" and "prenol polymer" is meant to include all derivatives and cyclic forms of the citronellol and prenol and polymer.

In the present specification, the structural formula of the compounds represents a certain isomer for convenience in some cases, but the present invention includes all isomers, such as geometrical isomers, optical isomers based on an asymmetrical carbon, stereoisomers, tautomers, and the like. In addition, a crystal polymorphism may be present for the compounds represented by the formula, it is noted that any crystal form, crystal form mixture, or anhydride or hydrate thereof is included in the scope of the present invention.

All percentages used herein, unless otherwise indicated, are by volume.

All ratios used herein, unless otherwise indicated, are by molarity.

number of protons associated with methylene groups adjacent to ether oxygen atoms (~3.3 ppm) compared to the protons associated with methylene groups adjacent to alcohol oxygen atoms (~3.6 ppm). The integrated ratio is found to be about 1:1 for these two different sets of protons.

The tube is then rinsed with a minimal amount of hexane and the isolated material is washed with 10% aqueous sodium carbonate. The hexane is then removed by vacuum distillation, resulting in a residue weighing 315 g. This material is further distilled under vacuum (0.7 mbar) at elevated temperature (up to 160° C.) to remove monomeric and dimeric species, resulting in a clear, odorless liquid identified as follows, wherein n is 1-4 on average:

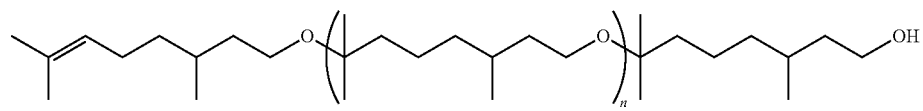

EXAMPLES

Example 1: Synthesis of Citronellol Polymers

Citronellol (250 g) is combined neat with 5 g of Amberlyst cationic resin and is stirred for 5 days at room temperature. It is observed that >80% polymerization has taken place by $^1$H NMR. (Note, the reaction time can be dramatically reduced by increasing the concentration of catalyst and temperature). The reaction mixture is then diluted with hexane and is filtered to remove catalyst. The organic phase is then washed with aqueous sodium bicarbonate to remove any residual acid, and then with DI water once. The hexane is then removed on a rotary evaporator under reduced pressure. 269 g of material resulted which then underwent further distillation.

A fraction (37.5 g) containing fairly clean citronellol is obtained from distillation at 0.5-1.5 mbar and 60-65° C. head temperature. A second fraction containing 46.9 g of >95% pure citronellol dimer is obtained from distillation at 0.2-0.45 mbar and a head temperature of 115-132° C. The remainder of the material remains in the distillation pot and appears to be higher MW polyether.

Example 2: Continuous Citronellol Polymerization Over Cation Exchange Resin

A 6-foot-long, 0.25-inch smooth bore stainless steel tube with a 0.01-inch thickness is packed with Amberlyst resin and is coiled and outfitted with PTFE tubing on either end for continuous flow. The coil is heated to 50° C. in an oil bath and 300 g of citronellol is pumped through the packed coil at a rate of 2 ml/min. The material coming out of the coil has reached a high degree of polymerization as shown by $^1$H-NMR analysis. NMR indicates a dramatic increase in the The compound of Example 2 is found to have a viscosity of 238.5 mPa at 25° C., a refractive Index of 1.47 at 20° C., and a surface tension of 30.1 mN/m.

In addition, other distillation fractions yield other citronellol oligomers, including citronellol dimer, and citronellol polymer wherein n is 3-6 on average.

Example 3: Citronellol Polymer Acetate

To 702 g of the compound of Example 2 (citronellol polymer, n=1-4), 1.0 L of tetrahydrofuran (THF) and 18.33 g of N,N-dimethylaminopyridine (DMAP) are added. The solution is stirred and cooled in an ice bath. Acetic anhydride (229 g) is added dropwise, and then the solution is allowed to warm to room temperature and is stirred overnight. The reaction is found to be complete by thin layer chromatography (TLC) and it is quenched with the slow addition of 100 ml of water. After stirring for three hours, the THF is removed under reduced pressure on a rotary evaporator and the organic phase is diluted with MTBE and washed with 10% sodium carbonate until the pH is 8. The phases are partitioned, the organic phase is dried with sodium sulfate, and filtered. The material is decolored with activated carbon and further distilled under reduced pressure to remove trace solvent, to yield 676 g of a clear odorless liquid identified as follows, wherein n is 1-4 on average:

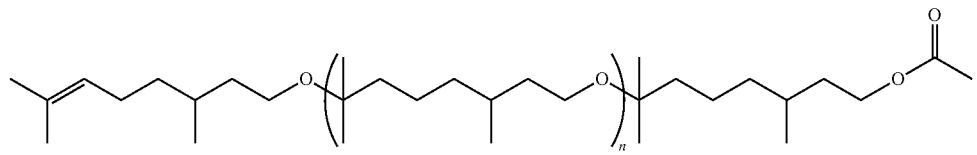

The compound of Example 3 is found to have a viscosity of 39.3 mPa at 25° C., a refractive Index of 1.4575 at 20° C., and a surface tension of 27.2 mN/m.

According to an analogous procedure, the compound of Example 2 (citronellol polymer, n=3-6) is reacted with acetic anhydride and DMAP in THF solvent and purified to yield citronellol polymer acetate, wherein n is 3-6 on average.

Example 4: Citronellol Polymer Butyrate

Following the procedure substantially as described in Example 3, the corresponding butanoate ester is prepared by substituting butyric anhydride for acetic anhydride. A clear odorless liquid identified as follows, wherein n is 1-4 on average:

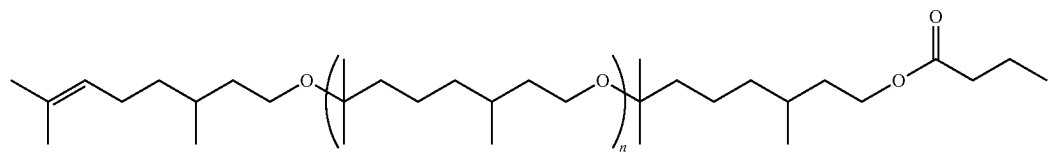

The compound of Example 4 is found to have a viscosity of 55.7 mPa at 25° C., a refractive index of 1.4882 at 20° C., and a surface tension of 27.8 mN/m.

Example 5: Citronellol Dimer Oleate

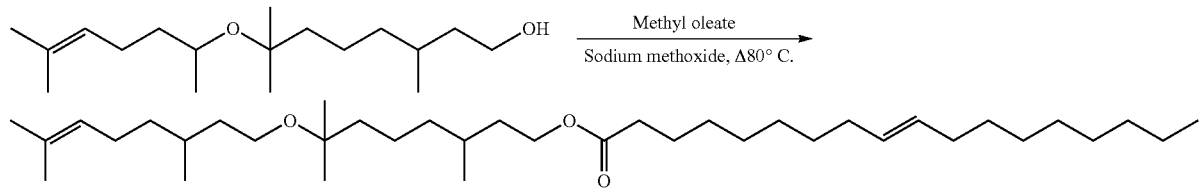

10 g of Citronellol dimer (as produced by Example 1) and 9 g of methyl oleate are mixed well by stirring in a 250 mL flask. 0.1 g of sodium methoxide is slowly added to the reaction mixture. The reaction is stirred at 80° C. for 5 hours, during which methanol was continually distilled out of the reaction. TLC, GC and NMR are used to monitor the completion of the reaction. The reaction is quenched using 50% acetic acid in dH2O. The reaction mixture is extracted with hexane and concentrated under reduced pressure, 16 g of a crude product is obtained and further purified using column chromatography. 3 g of pure product is isolated after chromatography, identified by NMR as the oleate ester of citronellol dimer.

Example 6: Adipate Diester of Citronellol Dimer tion took place at 80° C. for 4 hours. During the reaction methanol was distilled out of the reaction. TLC, GC and NMR were used to follow up the reaction. Reaction was quenched using 50% acetic acid in dH2O. Reaction mixture was extracted with hexane and concentrated down.

Example 7: Cyclic Citronellol Dimer 8 g of the citronellol polymer crude distillation fraction from Example 2 is used to purify cyclic citronellol dimer via column chromatography. 0.2 g of pure solid cyclic dimer was isolated and the structure confirmed by NMR.

Example 8: Evaluation of Insect Repellency

Citronellol dimer (Sample A; as produced by Example 1), citronellol dimer acetate (Sample B; as produced by Example 3), and citronellol polymer acetate (n=3-6) (Sample C; as produced in Example 3) are compared to the standard insect repellent DEET (di-ethyl-meta-toluamide) in an in vitro method using female Yellow Fever mosquitos (*Aedes aegypti*). Mosquitos are exposed to the treatments applied to 3-cm diameter collagen membranes placed over warmed, blood-filled wells in a multi-well plate. The wells are pre-warmed to 96-100° F., and then citrated whole blood with ATP is poured into each well to completely fill. The

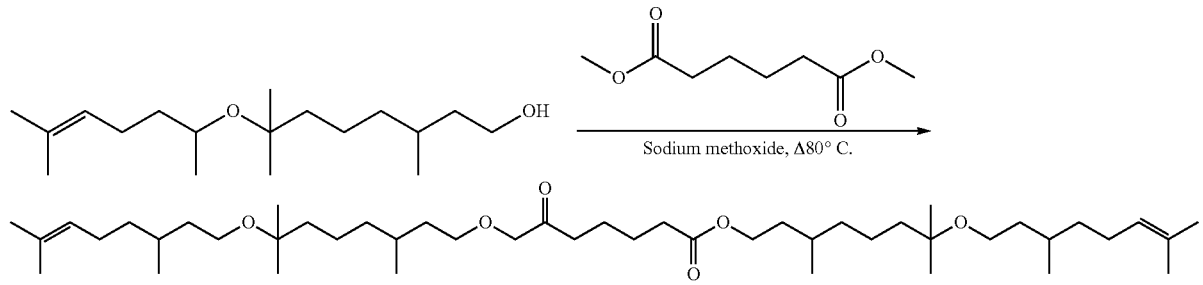

10 g of Citronellol dimer and 3 g of dimethyl adipate was mixed well by stirring in a 250 mL flask. 0.1 g of sodium methoxide was slowly added to the reaction mixture. Reacmembrane is applied and secured using vacuum grease. To each membrane 25 microliters of the test solution is applied, and the solution is allowed to dry. The plate is then placed into a plastic box enclosure having 250 adult female mosquitos. The number of instances of a mosquito probing the membrane is recorded during a 20-minute period. The entire procedure is repeated until five replicates are complete. Treatment positions in the plates are rotated between each replicate to eliminate any positional bias. Fresh blood and mosquitoes are used in each replicate. Percent repellency is calculated by comparison to a negative control membrane treated only with water. It is found that all three citronellol derivatives result in substantially similar repellency as 20% DEET isopropanol solution (all four about 97-99% repellency), as compared to a water positive control.

| Treatment: | Water | DEET | Sample A | Sample B | Sample C |
|---|---|---|---|---|---|
| Mosquito Probes | 39 | 0 | 0.4 | 0.6 | 0.6 |
| % Repellency | — | 100% | 99.1% | 98.8% | 98.1% |

Example 9: Reduction of Unsaturated Citronellol Homopolymer

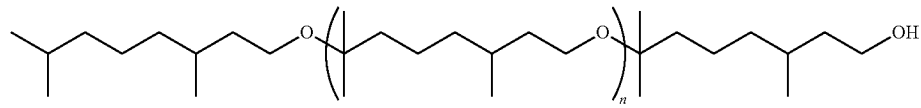

The citronellol homopolymer obtained substantially according to Example 2, wherein n is 1-4 on average, is subjected to catalytic hydrogenation to yield the corresponding saturated compound, as shown above. 100 g of the citronellol homopolymer is combined with 5% palladium on carbon (250 mg) in ethanol (100 mL) in a pressure reactor. The reaction is carried out with shaking under an atmosphere of 400 psi hydrogen for 72 hours at room temperature. The reaction mixture is then filtered through Celite, and the ethanol is removed under vacuum distillation to yield a colorless liquid (quantitative yield). Proton NMR confirms the complete absence of olefinic protons in the product.

Example 10: Insect Repellency of Citronellol Polymer Solutions

Citronellol polymer acetate (n=3-6) (Sample C; as produced as a fraction in Example 2) is dissolved in isopropyl alcohol (IPA) solvent at a concentration of 1%, 5%, or 20% by weight. This is compared to a solution of DEET in IPA at 20% by weight as a control. The procedure is as described for Example 8. The results are summarized in the table below.

| Treatment: | IPA | DEET (20%) | Sample C 1% | Sample C 5% | Sample C 20% |
|---|---|---|---|---|---|
| Mosquito Probes | 48 | 0 | 51 | 36 | 1.4 |
| % Repellency | 0% | 100% | 12.2% | 24.2% | 94.8% |

The results demonstrate a dose-response relationship between the concentration of the citronellol polymer and the mosquito repellent effectiveness.

Example 11: Evaluation of Paint and Coating Compositions

Citronellol polymer acetate (n=3-6) (Sample C; produced according to Example 3) or citronellol polymer alcohol (n=3-6) (Sample D; produced according to Example 2) are mixed at a 1:1 or 3:1 ratio with one of three commercial base paint formulations (Base A, Base B, Base C). The mixtures are evaluated for physical properties important in paint and coating applications. The compositions of Base A, Base B and Base C, are shown in the Table below:

| Description | Base A Water-based high gloss brush on acrylic enamel | Base B Oil-based protective acrylic enamel | Base C Traditional shellac finish and sealer |
|---|---|---|---|
| Acrylate Resin | 1-20% | 1-20% | |
| Shellac | | | 1-10% |
| Hydrocarbon Solvents (e.g., propane, butane, toluene, ethylbenzene, xylene) | 25-75% | | |

-continued

| Description | Base A Water-based high gloss brush on acrylic enamel | Base B Oil-based protective acrylic enamel | Base C Traditional shellac finish and sealer |
|---|---|---|---|
| Ketone solvents (e.g., acetone, methyl ethyl ketone, diphenyl ketone) | 10-25% | | |
| Alcoholic Solvents (e.g., ethanol, isopropanol) | | | 70-95% |
| Hydrogenated Light Distillate | | 25-50% | |
| Light Aromatic Solvent Naptha | | | |
| Titanium Dioxide | 0.1-1.0% | 0.1-1.0% | |
| Carbon Black | 0.1-1.0% | | |
| Methyl Ethyl Ketoxime | | 0.1-1.0% | |
| Other Solvents | | 25-50% | |

The mixtures are applied side-by-side in triplicate to a pine board with a single, back and forth brush stroke. The following criteria were analyzed: gloss, color quality, oil feel, coating evenness, smoothness and water repellency (beading). The results of the comparisons are shown in the table below:

| Base | Cmpd | Ratio (base:cmpd) | Gloss | Color | Oil Feel | Even Coating | Smoothness | Beading |
|---|---|---|---|---|---|---|---|---|
| A | — | — | High | Great | None | Medium | Medium | Poor |
| A | Samp D | 1:1 | Medium | Good | Low | Low | Medium | Poor |
| A | Samp D | 3:1 | Medium | Great | Medium | High | High | Poor |
| A | Samp C | 1:1 | Medium | Good | Low | Low | Medium | Poor |
| A | Samp C | 3:1 | Medium | Great | Low | High | High | Poor |
| B | — | — | High | Great | Low | High | Medium | Great |
| B | Samp D | 1:1 | High | Great | High | Low | Low | Great |
| B | Samp D | 3:1 | High | Great | High | Low | Low | Great |
| B | Samp C | 1:1 | Medium | Good | High | None | None | Good |
| B | Samp C | 3:1 | High | Great | Low | High | High | Great |
| C | — | — | Medium | Great | None | High | Medium | Great |
| C | Samp D | 1:1 | Low | Poor | Low | Low | Medium | Great |
| C | Samp D | 3:1 | Medium | Good | Low | High | Medium | Great |
| C | Samp C | 1:1 | None | Poor | None | Medium | Low | Great |
| C | Samp C | 3:1 | Medium | Good | None | High | Medium | Great |

The results demonstrate that the addition of compounds according to the present disclosure can enhance coating evenness and smoothness of both acrylic and shellac base formulations. In addition, both citronellol polymers tested are found to be freely miscible with each of the three base formulations.

Example 12: Evaluation of Fragrance Fixative Properties

A blotter study is performed to assess the odor retention of two common fragrance ingredients, linalool and 1-(3,3-dimethylcyclohexyliethyl formate (Aphermate). A 50% w/w solution of linalool in ethanol or neat Aphermate is mixed in about a 3:1 ratio (fragrance polymer) with either citronellol polymer acetate (n=3-6) (Sample C; produced according to Example 3) or citronellol polymer alcohol (n=3-6) (Sample D; produced according to Example 2). Approximately 18-25 mg of each sample is dispensed onto a paper blotter. The study is conducted under ambient conditions (indoors, room temperature and ambient humidity). The strength of the fragrant odor is assessed periodically, the results shown in the table below.

| Sample | Hours after Blotting | | | | | | | |
|---|---|---|---|---|---|---|---|---|
| | 0 | 1 | 2 | 3 | 4 | 5 | 6 | 7 |
| Linalool | 5 | 5 | 4 | 3 | 2 | 2 | 0 | 0 |
| Linalool/Samp D | 5 | 5 | 4 | 3 | 3 | 3 | 3 | 3 |
| Linalool/Samp C | 5 | 5 | 4 | 3 | 3 | 1 | 1 | 1 |
| Aphermate | 5 | 5 | 4 | 3 | 3 | 2 | 0 | 0 |
| Aphermate/Samp D | 5 | 5 | 4 | 3 | 3 | 3 | 3 | 3 |
| Aphermate/Samp C | 5 | 5 | 4 | 3 | 2 | 1 | 1 | 1 |

The results demonstrate that fragrances mixed with citronellol polymers according to the present disclosure retain a significant amount of fragrant odor at 5-7 hours that is absent from when the pure compositions are blotted.

Example 13: Evaluation of Defrizzing Properties

Neat citronellol polymer acetate (n=3-6) (Sample C; produced according to Example 3) and neat citronellol polymer alcohol (n=3-6) (Sample D; produced according to Example 2) are compared to a commercial frizz-reducing hair-care product. Commercial 100% pure human hair extensions are washed, shampooed, and towel blotted to remove excess moisture. The hair extensions are all substantially the same in length, thickness, texture and appearance. A small amount of the sample (about 150-200 mg) is then distributed evenly through the hair manually with both hands. Observations are taken immediately after the sample has been distributed through the hair, as well as after less than 30 minutes of further air drying of the hair samples (indoor ambient conditions). According to the label, the commercial product comprises (in order of declining concentration) a mixture of cyclopentasiloxane, dimethiconal, dimethicone cross polymer, benzophenone-3, fragrance, benzyl butanoate and butylphenyl methylpropionyl.

The following observations are made:

| Sample: | Initial Application | After Air Drying |
|---|---|---|
| Untreated | Hair is frizzy and dry to the touch remains substantially the same throughout observation period | |
| Commercial Product | The sample is moderately viscous and applies smoothly | Hair looks and feels dry, frizziness remains, and overall the appearance is similar to the untreated control |
| Sample D | The sample is less viscous than the commercial product, applies smoothly, and the small amount used was more than enough for | Hair feels very oily and soft; less frizz is apparent compared to the commercial product; some curls in the hair lose some of |

| Sample: | Initial Application | After Air Drying |
|---|---|---|
| | even distribution throughout the hair | their texture |
| Sample C | The sample applies smoothly, and the small amount used was more than enough for even distribution throughout the hair | Hair felt soft and moisturized, but not oily (no feel of excess oil); less frizz is observed compared to either the commercial product or Sample D; all curls are well maintained |

These results show that both tested polymers according to the invention reduce frizziness in natural human hair to an extent that is better than a comparable commercial product, while the polymer of Sample C provided the best texture and feel to the treated hair.

Example 14: Evaluation of Malodor Reduction

A malodorous composition is prepared by combining 60 microliters of methyl sulfide and 60 microliters of allyl sulfide in a 10 mL glass vial. To this neat malodor mixture, ethanol is added to yield solutions which have a concentration of 1 ppm or 100 ppm of odorant compounds. A mixture is then made by, combining either a commercial scented oil, or citronellol polymer acetate (n=3-6) (Sample C; produced according to Example 3), or citronellol polymer alcohol (n=3-6) (Sample D; produced according to Example 2), with the malodorant ethanol solution in a ratio of 9:1 w/w. A sample of the commercial scented oil, as well as samples of the commercial scented oil mixed with Sample C and D in a 9:1 w/w ratio, are also used for comparison. A sample of blotter paper is dipped into each of the test samples to the same depth in order to absorb the same amount of liquid onto the paper. Each blotter paper is then placed in its own 400 g lidded jar, and the jar is sealed and left for one hour. Then jar is then opened and the odor coming from the jar is immediately evaluated. The results are shown in the table, below:

| | Sample | Odor Observation at 1 Hour |
|---|---|---|
| 1 | Scented Oil | Strong pleasant scent |
| 2 | Scented Oil with Sample D, 9:1 w/w | Strong pleasant scent, stronger than (1) |
| 3 | Scented Oil with Sample C, 9:1 w/w | Strong pleasant scent |
| 4 | 1 ppm Malodor Comp. | Weak malodor |
| 5 | 1 ppm Malodor Comp with Scented Oil, 1:9 w/w | No malodor |
| 6 | 1 ppm Malodor Comp with Sample D, 1:9 w/w | No malodor |
| 7 | 1 ppm Malodor Comp with Sample C, 1:9 w/w | No malodor |
| 8 | 100 ppm Malodor Comp. | Strong malodor |
| 9 | 100 ppm Malodor Comp with Scented Oil, 1:9 w/w | Strong malodor |
| 10 | 100 ppm Malodor Comp with Sample D, 1:9 w/w | Weaker malodor |
| 11 | 100 ppm Malodor Comp with Sample C, 1:9 w/w | Weaker malodor |

The results demonstrate that the polymers according to the present disclosure can effectively mask or minimize the strong adverse malodor caused by volatile organic sulfides (i.e., rotten egg-like odors). It is also unexpectedly found that the polymer of Sampler) seemed to enhance the pleasant fragrance scent of the commercial scented oil.

Example 15: Cosmetic Compositions

Moisturizing lotion, cosmetic primer and cosmetic sealer are prepared using citronellol polymer acetate (h=3-6) (Sample C; produced according to Example 3), according to the table below (percent values shown are w/w):

| Ingredient | Purpose | Lotion Control | Lotion | Primer | Concealer |
|---|---|---|---|---|---|
| Water | Diluent | 77.75% | 75.75% | | 60% |
| Isopropyl myristate | Occlusive | 4.25% | 4.25% | | 5% |
| Glycerin | Humectant | 5.2% | 4% | | |
| Triglyceride blend | Thickener | 4% | 4% | | 10% |
| Glyceryl Stearate | Emulsifier | 4% | 4% | | |
| Cetyl Alcohol | Emulsifier | 2% | 2% | | 4% |
| Stearic Acid | Emulsifier | 2% | 2% | | |
| Phenoxyethanol | Preservative | 0.5% | 0.5% | 0.5% | 0.5% |
| Fragrance | Fragrance | QS | QS | | 0.3% |
| Sample C | Soothing agent | — | 3.5% | 34.5% | 10% |
| Propylene glycol | Emollient | | | 45% | 4% |
| Silica dimethyl silylate | Gellant | | | 20% | |
| Silica | Texturizer | | | | 2% |
| Titanium dioxide | Color pigment | | | | 3% |
| Iron Oxide | Color pigment | | | | 1.20% |

Each lotion composition is prepared by first combining the water and glycerol and heating to about 70-75° C. in one beaker, and combining the oil phases (cetyl alcohol, stearic acid, isopropyl myristate, glyceryl stearate, triglyceride blend, and Sample C) in a second beaker, and also heating to about 70-75° C. Into a plastic beaker is then successively added the hot oil phase followed by the hot water phase, and the beaker is immediately immersed in a cold water bath and the mixture is mixed at high speed with a handheld electric mixer. To the resulting homogenous emulsion at about 30-40° C. is added the preservative, fragrance with gentle mixing. Both compositions have a pH of 5 to 5.5.

It is found that control lotion is homogenous and has a slightly hard texture. After applying it to the skin, it becomes easily dried off. In contrast, it is found that the lotion composition containing Sample C has a softer, smoother feel on the skin and does not dry off.

The primer composition is prepared heating the propylene glycol to 70-75° C. in a beaker, then slowly adding the silica dimethyl silylate with stirring to form a uniform gel. The Sample C is then slowly added with stirring, followed by cooling the mixture. The preservative is then added after the mixture has cooled below 40° C. The resulting product is uniform gel with a velvet-like feel after application to the skin. Compared to a similar commercial silicone-based primer, the present primer provides a smoother and more glowy appearance on the skin.

The concealer composition is prepared by first combining the water and glycerol and heating to about 70-75° C. in one beaker, and combining the oil phases (cetyl alcohol, triglyceride blend, silica and Sample C) in a second beaker, and also heating to about 70-75° C. The titanium dioxide and iron oxide colorants are then ground together with a mortar and pestle, and then combined with the propylene glycol. The propylene glycol/colorant mixture is then added to the oil phases and mixed. Into a plastic beaker is then successively added the hot oil phase followed by the hot water phase, and the beaker is immediately immersed in a cold water bath and mixed with a spatula while cooling. This results in two-phase heterogenous mixture comprising an oil phase and a mixed oil/water emulsion.

It is found that the oil phase presents highly pigmented properties, and therefore shows very good coverage. The whole formulation is soft matte and upon application to the ski a soft, velvet feel is obtained. The composition is compared to a commercial concealer, the present concealer shows more matte than wet properties.

Example 16: Double Bond Epoxidation

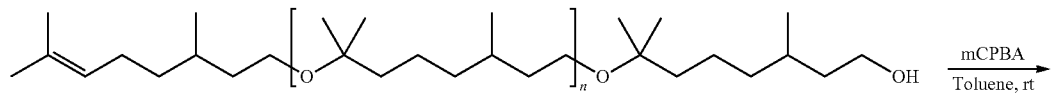

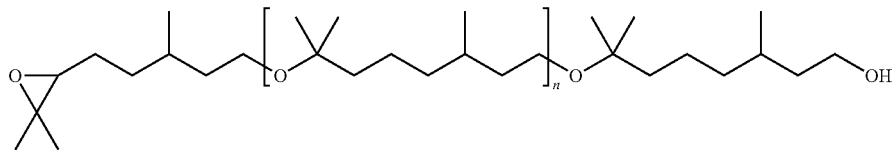

In a 250 mL three-necked round-bottom flask is placed 25.5 g (108.5 mmol) of the polymer of Example 2 (n=3-6) and toluene (100 mL). 3-Chloroperhenzoic acid (mCPBA, 10.5 g, 60.8 mmol) is added slowly as a solid. The reaction is kept stirring for another 15 hours at room temperature. Saturated sodium sulfite (50 mL) solution is added to the reaction mixture to quench it and it is stirred for 2 hours. The organic phase is washed with sodium carbonate solution (10%) until the pH is 8. The organic phase is dried with sodium sulfate and concentrated to give the crude polymer epoxide product. To eliminate residual benzoic acid, the crude product is dissolved in MTBE (100 mL) and stirred with sodium carbonate solution (1.0%) (50 ml) for 15 hours. The solvent from the organic phase is evaporated after phase separation to give the final crude product with a yield of 23 g. Proton NMR shows the diagnostic epoxide peaks at about 2.66 ppm ($CDCl_3$ solvent). Differential scanning calorimetry (DSC) shows that the epoxide reacts at ~150-170° C. Further experiments confirm that the crude epoxide product reacts successfully with amine nucleophiles in ring opening reactions.

Example 17: Improved Continuous Acylation of Citronellol Polymer 200 g of citronellol polymer alcohol (n=3-6) (Sample D; produced according to Example 2) is combined with 60.5 ml of acetic anhydride and is pumped at 10 ml/min through a 6 ft long stainless steel tube (0.25 inch diameter) coded to fit into an oil bath maintained at 100-105° C. The material is continuously circulated through the tube until the reaction is judged to be greater than 97% complete (approximately 5 passes through the coil). The product is isolated by dissolving with crude product in hexane, washing the organic phase with water, then washing with 10% aqueous sodium carbonate, followed by solvent removal under vacuum. The product is analyzed and is found to be consistent with the citronellol polymer acetate (n=3-6) as obtained according to Example 3.

Alternatively, in some experiments, the acetic acid and residual acetic anhydride may be removed directly via distillation.

Example 18: Continuous Polymerization of Isoprenol

A 6 ft long stainless steel (0.25 inch diameter) is filled with Amberlyst cationic exchange resin and is coiled to fit into an oil bath maintained at about 50° C. 66 g of isoprenol is flowed through the tube at a flow rate of 1.9 g/min. $^1$H NMR ($CDCl_3$) analysis of the product shows predominantly polymerized product with no residual monomer and a trace amount of isoprene. Diagnostic peaks for the polymer product are observed at 1.0-1.25 ppm for the geminal dimethyl peaks, 1.5-1.75 ppm for the adjacent methylene peaks, and 3.5-3.75 ppm for the methylene peaks adjacent to the ether linkage. Following distillation of low boiling oligomers at 120° C. and 1.2 mbar, the $^1$H NMR of the residue showed that only trace olefin protons were present, suggesting a high degree of polymerization.

Under similar conditions, isoprenol is observed to undergo much better conversion to polymer than prenol.

The invention claimed is:

1. A compound according to Formula I:

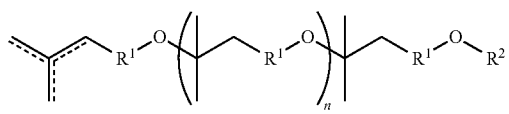

wherein,
the terminal group

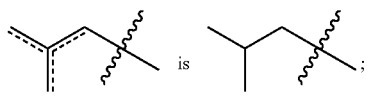

is $R^1$ is optionally substituted $C_1$-$C_{12}$ alkyl;
$R^2$ is H, $C_{1-20}$alkyl, aryl, aryl$C_{1-2}$ alkyl, optionally unsaturated C(O)—$C_{1-20}$ alkyl, or optionally substituted C(O)-aryl; and n is an integer between 0 and 20.

2. The compound according to claim 1, wherein $R^1$ is unsubstituted linear $C_1$-$C_{12}$ alkyl or unsubstituted branched $C_3$-$C_{12}$ alkyl.

3. The compound according to claim 1, wherein $R^1$ is unsubstituted branched or unsubstituted linear $C_6$ alkyl.

4. The compound according to claim 3, wherein $R^1$ is $CH_2CH_2CH(CH_3)CH_2CH_2$.

5. The compound according to claim 2, wherein $R^2$ is saturated $C_{1-6}$ alkyl.

6. The compound according to claim 1, wherein $R^2$ is saturated or unsaturated C(O)—$C_{1-6}$ alkyl.

7. The compound according to claim 1, wherein $R^2$ is saturated or unsaturated C(O)—$C_{7-20}$ alkyl.

8. The compound according to claim 1, wherein n is 1, 2, 3, 4, 5, 6, 7, 8, 9, or 10.

9. The compound according to claim 1, wherein $R^1$ is $CH_2CH_2CH(CH_3)CH_2CH_2$, n is 1, 2, 3, 4, 5, 6, or 7, and $R^2$ is C(O)—$C_{1-6}$ alkyl and said $C_{1-6}$ alkyl is selected from the group consisting of methyl, ethyl, propyl, isopropyl, n-butyl, isobutyl, sec-butyl, tert-butyl, n-pentyl, or and n-hexyl.

10. The compound according to claim 1, wherein $R^2$ is H.

11. The compound according to claim 1, wherein $R^2$ is unsaturated C(O)—$C_{7-20}$ alkyl.

12. The compound according to claim 11, wherein $R^2$ is C(O)—$C_{17}$ alkyl.

13. The compound according to claim 2, wherein $R^2$ is C(O)—$C_{1-6}$ alkyl and said $C_{1-6}$ alkyl is selected from the group consisting of methyl, ethyl, propyl, isopropyl, n-butyl, isobutyl, sec-butyl, tert-butyl, n-pentyl, or and n-hexyl.

14. The compound according to claim 1, wherein $R^2$ is selected from the group consisting of methyl, ethyl, propyl, isopropyl, n-butyl, isobutyl, sec-butyl, tert-butyl, n-pentyl, n-hexyl, n-octyl, and n-decyl.

15. The compound according to claim 1, wherein $R^2$ is phenyl, benzyl, or benzoyl.

16. The compound according to claim 1, wherein n is 1, 2, 3, 4, 5, 6, or 7.

17. The compound according to claim 1, wherein n is 1, 2, or 3.

18. The compound according to claim 1, wherein $R^1$ is $CH_2CH_2CH(CH_3)CH_2CH_2$, n is 1, 2, 3, 4, 5, 6, or 7, and $R^2$ is H.

19. The compound according to claim 1, wherein $R^1$ is $CH_2CH_2CH(CH_3)CH_2CH_2$, n is 1, 2, 3, 4, 5, 6, or 7, and $R^2$ is C(O)—$C_{1-6}$ alkyl and said $C_{1-6}$ alkyl is selected from methyl, ethyl, propyl, and isopropyl.

20. The compound according to claim 1, wherein $R^1$ is $CH_2CH_2CH(CH_3)CH_2CH_2$, n is 1, 2, 3, 4, 5, 6, or 7, and $R^2$ is C(O)—$C_{1-6}$ alkyl and said $C_{1-6}$ alkyl is methyl.

21. A composition comprising the compound according to claim 1, or any mixtures thereof, in combination with at least one suitable solvent, carrier, or excipient.

22. The composition according to claim 21 which is a fragrance composition, or a perfume composition, or a soap composition, or an insect repellant composition, or an insecticide composition, or a detergent composition, or a household cleaning agent composition, or an air freshener composition, or a room spray composition, or a pomander composition, or a candle composition, or a cosmetic composition, or a toilet water composition, or a pre-shave or after-shave lotion composition, or a talcum-powder composition, or a hair-care product composition, or a body deodorant composition, or an antiperspirant composition, or a shampoo composition, or a pet litter composition, or a topically applied skin care composition, or a paint or coating composition, or a lubricant composition, or a plastic composition, or a defoamer composition, or a hydraulic fluid composition, or an antimicrobial composition.

23. The composition according to claim 21, which is a fragrance composition, insect repellent composition, candle composition, or cosmetic composition.

24. A mixture comprising compounds according to claim 1, wherein the mixture comprises compounds having n values from 0 to 8 and all of the compounds in the mixture have the same groups $R^1$ and $R^2$.

25. The mixture according to claim 24, wherein the compounds in the mixture have an average n value of 1-4.

26. The mixture according to claim 24, wherein the compounds in the mixture have an average n value of 3-6.

27. The mixture according to claim 24, wherein the mixture consists of compounds of Formula I wherein $R^1$ is $CH_2CH_2CH(CH_3)CH_2CH_2$ and $R^2$ is H, and the compounds have n values selected from 0, 1, 2, 3, 4, 5, 6 and 7.

28. The mixture according to claim 24, wherein the mixture consists of compounds of Formula I wherein $R^1$ is $CH_2CH_2CH(CH_3)CH_2CH_2$ and $R^2$ is C(O)—$C_{1-6}$ alkyl and said $C_{1-6}$ alkyl is methyl, and the compounds have n values selected from 0, 1, 2, 3, 4, 5, 6 and 7.

* * * * *